United States Patent
Lahav et al.

(10) Patent No.: US 9,160,956 B2
(45) Date of Patent: Oct. 13, 2015

(54) SHARED READOUT LOW NOISE GLOBAL SHUTTER IMAGE SENSOR

(71) Applicant: Tower Semiconductor Ltd., Migdal Haemek (IL)

(72) Inventors: Assaf Lahav, Binyamina (IL); Amos Fenigstein, Haifa (IL)

(73) Assignee: Tower Semiconductor Ltd., Migdal Haemek (IL)

( * ) Notice: Subject to any disclaimer, the term of this patent is extended or adjusted under 35 U.S.C. 154(b) by 335 days.

(21) Appl. No.: 13/764,766

(22) Filed: Feb. 11, 2013

(65) Prior Publication Data

US 2014/0226046 A1  Aug. 14, 2014

(51) Int. Cl.
  *H04N 5/3745* (2011.01)
  *H04N 5/353* (2011.01)

(52) U.S. Cl.
  CPC .......... *H04N 5/37457* (2013.01); *H04N 5/353* (2013.01)

(58) Field of Classification Search
  CPC ............ G03B 9/08–9/54; H04N 5/357; H04N 5/3572; H04N 5/25721
  USPC ......... 348/272, 281, 282, 283, 294, 295, 296, 348/297, 298, 299, 300, 301, 302, 303, 304, 348/307, 308, 311, 312, 314, 315, 316, 317, 348/319, 320, 321, 322, 323
  See application file for complete search history.

(56) References Cited

U.S. PATENT DOCUMENTS

| 5,543,838 | A  | * | 8/1996  | Hosier et al. ................... 348/311 |
| 6,160,281 | A  |   | 12/2000 | Guidash |
| 7,714,917 | B2 |   | 5/2010  | McKee |
| 8,089,036 | B2 |   | 1/2012  | Manabe |
| 2009/0108176 | A1 | * | 4/2009 | Blanquart .................. 250/208.1 |
| 2010/0013972 | A1 |   | 1/2010 | Adkisson et al. |
| 2013/0027596 | A1 | * | 1/2013 | Wan .............................. 348/302 |
| 2013/0044247 | A1 | * | 2/2013 | Kawahito et al. ............. 348/296 |
| 2014/0226047 | A1 |   | 8/2014 | Lahav et al. |

OTHER PUBLICATIONS

Lahav, Assaf, et al. "Design of photo-electron barrier for the Memory Node of a Global Shutter pixel based on a Pinned Photodiode", International Image Sensor Workshop (IISW), Bergen. Norway, Jun. 22-28, 2009, 3 pages.

Lauxtermann, Stefan, et al. "Comparison of Global Shutter Pixels for CMOS Image Sensors", International Image Sensor Workshop (IISW), Ogunquit, Maine, USA, Jun. 7-10, 2007, pp. 82-85.

Mori, Mitsuyoshi, et al. "1/4-Inch 2-Mpixel MOS Image Sensor With 1.75 Transistors/Pixel", IEEE Journal of Solid-State Circuits, vol. 39, No. 12, Dec. 2004, pp. 2426-2430.

* cited by examiner

*Primary Examiner* — Twyler Haskins
*Assistant Examiner* — Peter Chon
(74) *Attorney, Agent, or Firm* — Bever, Hoffman & Harms, LLP

(57) ABSTRACT

A global shutter image sensor includes an array of pixel groups arranged in rows and columns, each pixel group including four pixels and a shared readout circuit having a floating diffusion. Each pixel includes a photodiode, a transfer gate and a charge coupled gate (CCG) device. The CCG devices are coupled in series with the floating diffusion of the shared readout circuit. Control circuitry controls the image sensor such that all of the pixels simultaneously capture image information (charges) and then transfer the captured charges to the CCG devices during a global shutter operation. The control circuit then controls the CCG devices to act as a shift register that transfers the captured charges to the floating diffusion during sequential correlated double sampling readout phases. The readout circuit includes a shared reset transistor, a source-follower and row select transistor, and each pixel group is controlled by eight or fewer control signals.

20 Claims, 16 Drawing Sheets

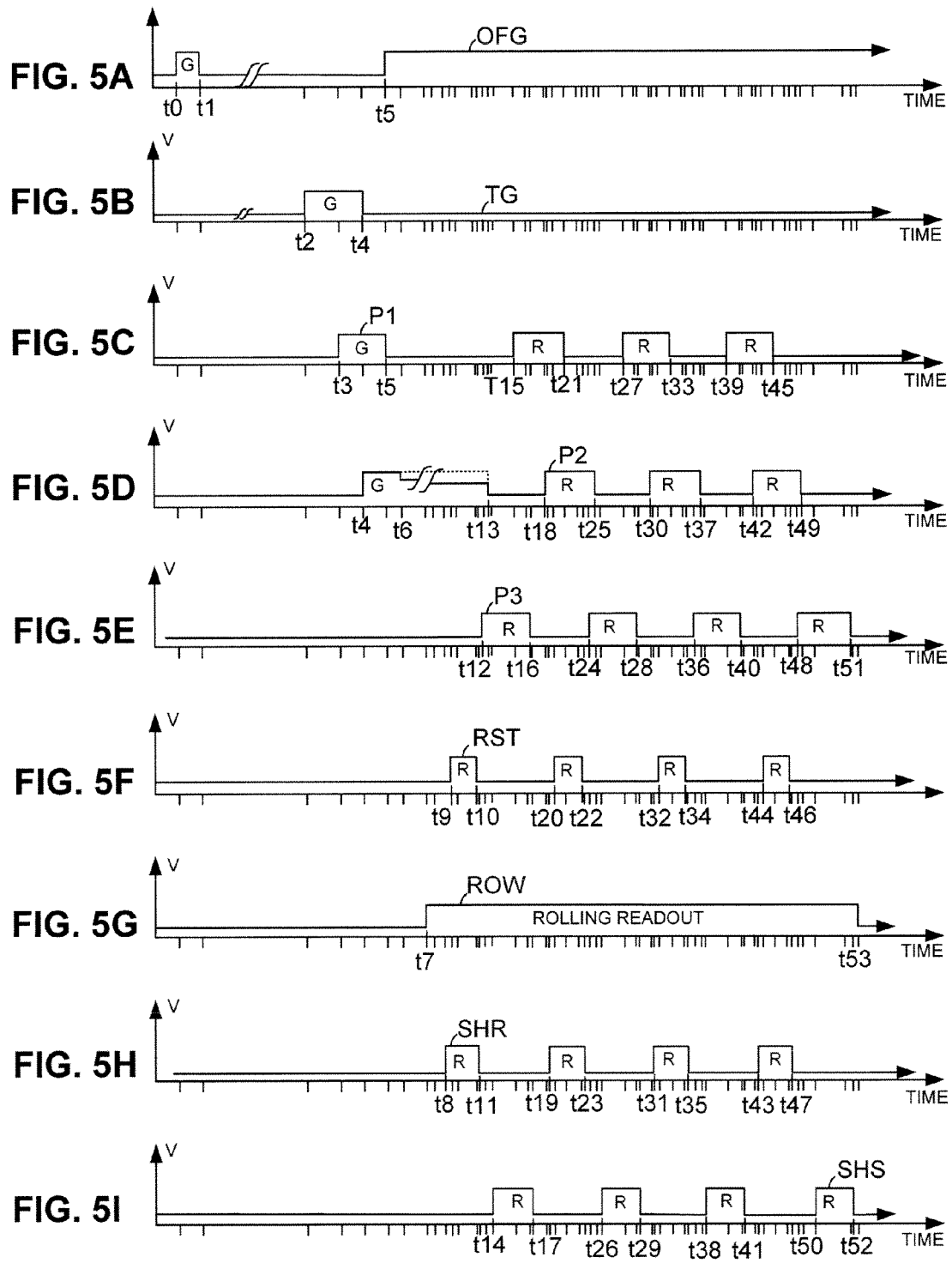

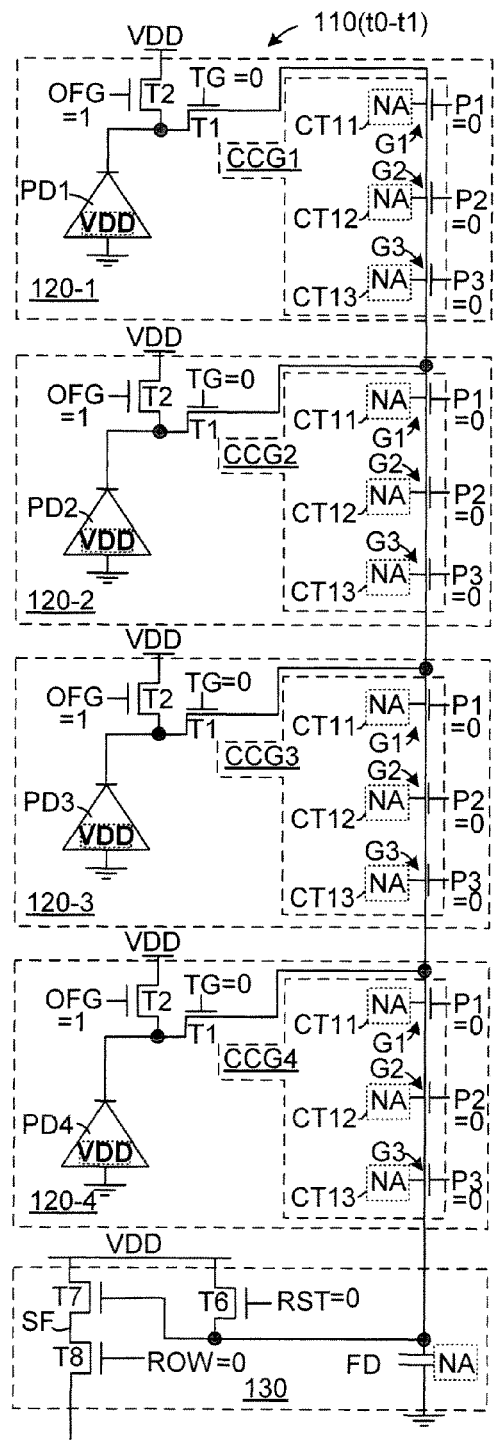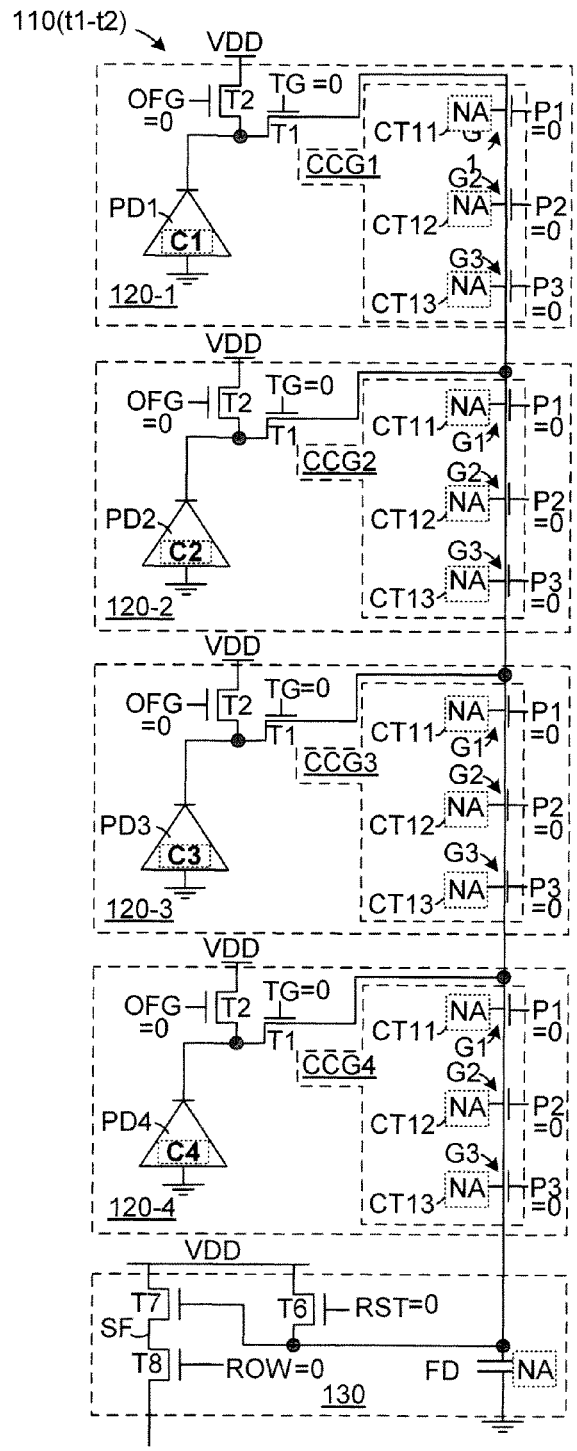
FIG. 6A
FIG. 6B

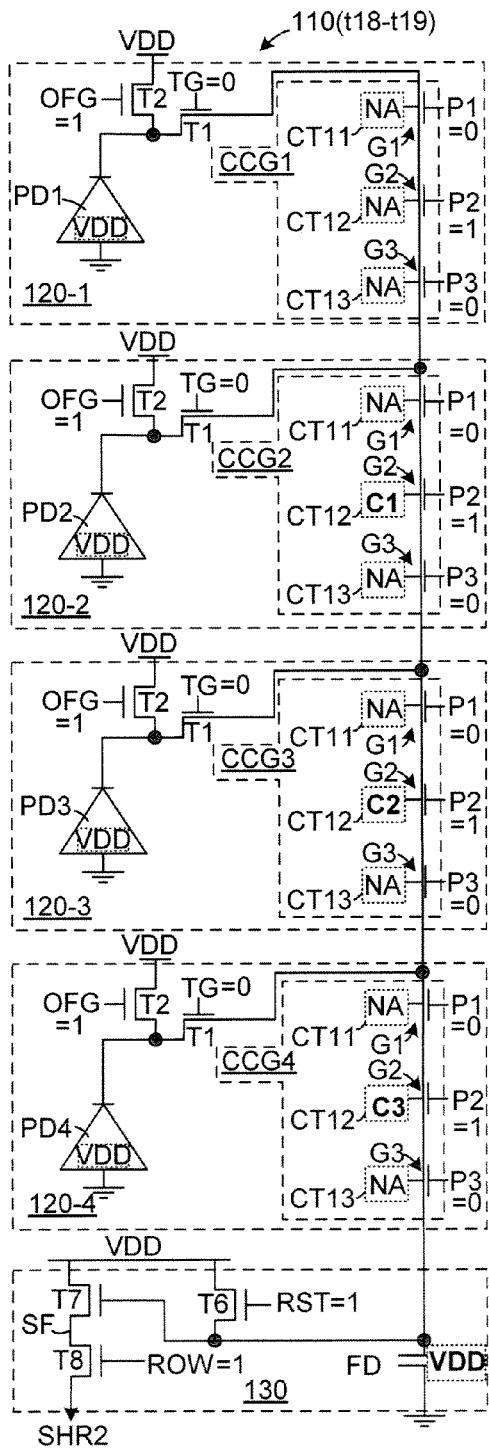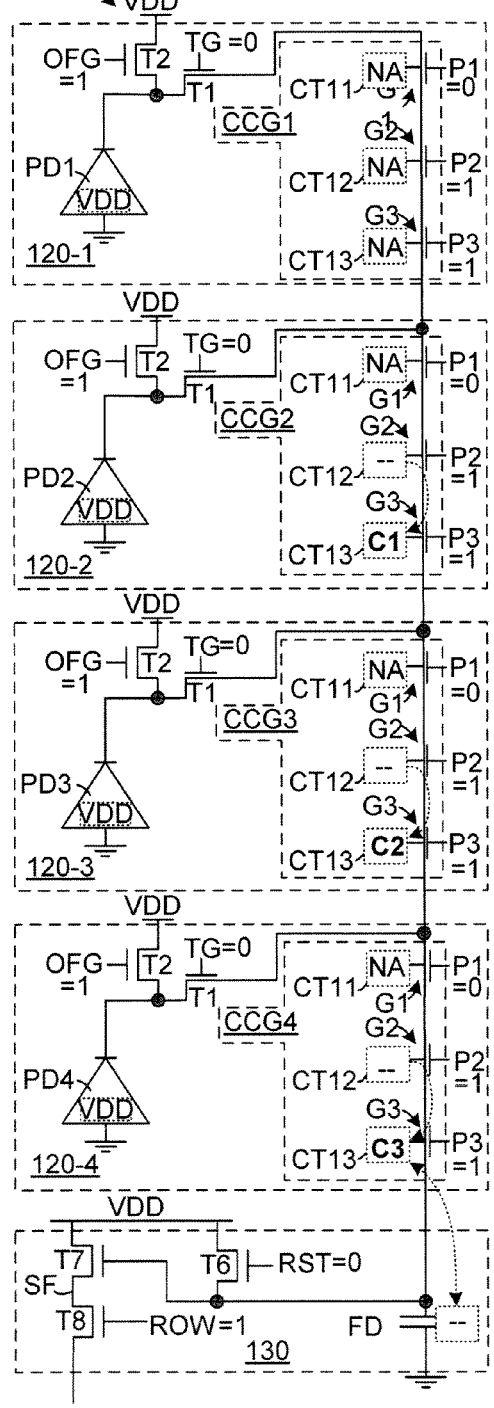
FIG. 9A  FIG. 9B

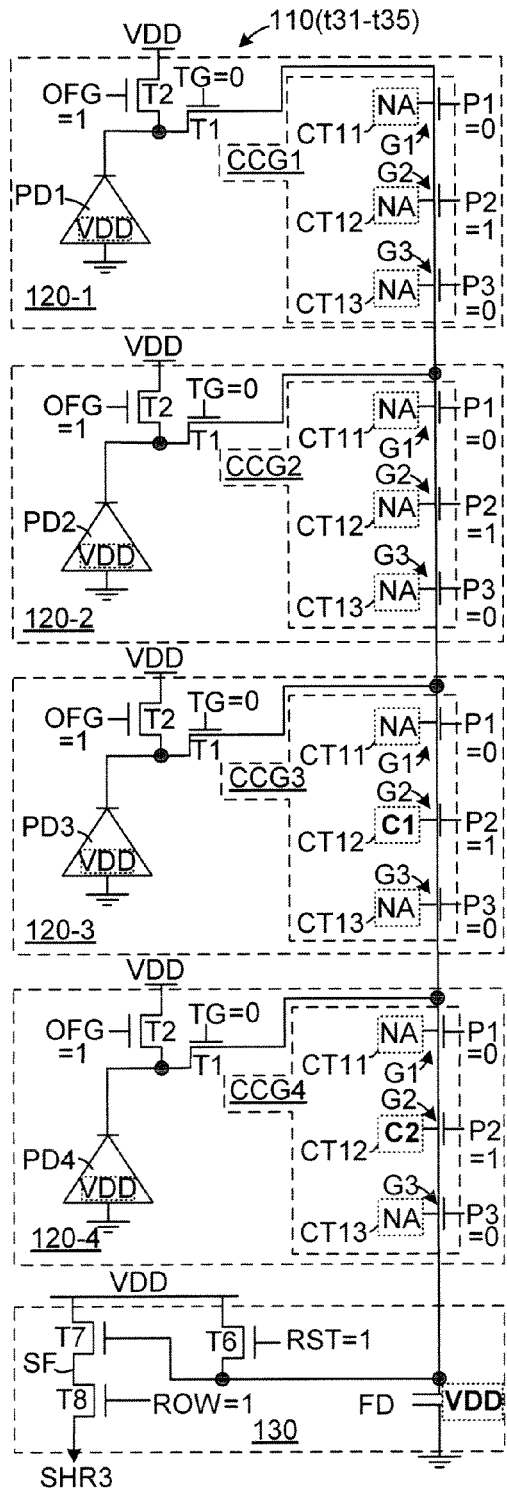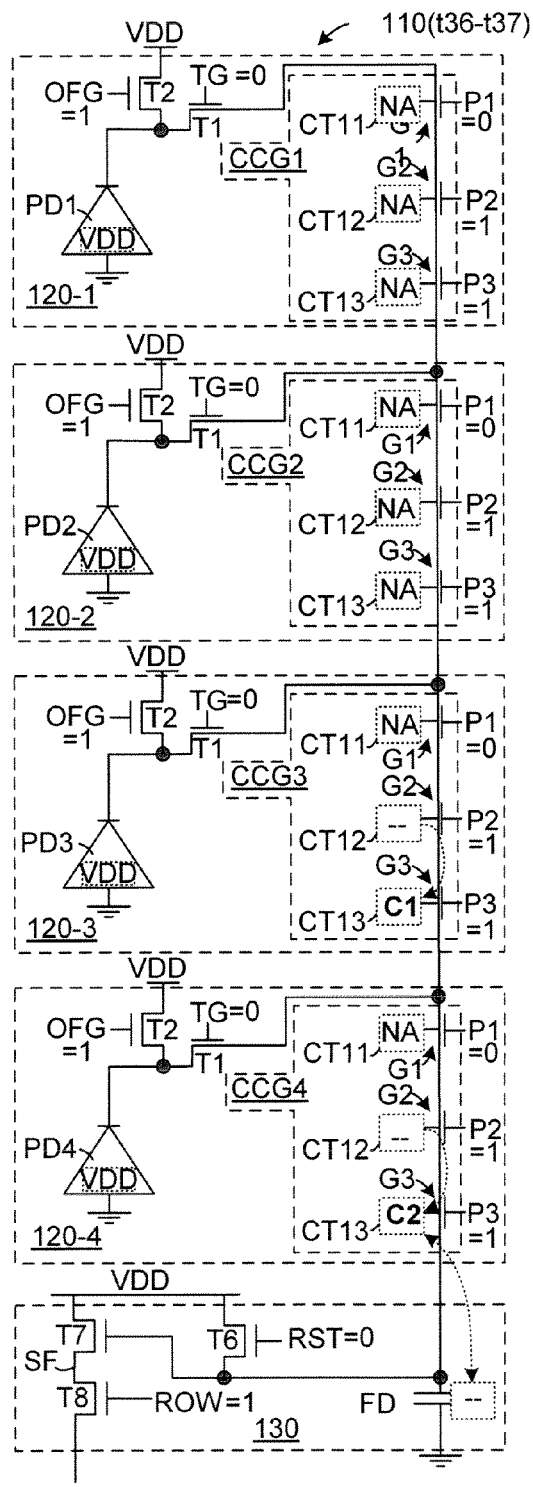
FIG. 10A  FIG. 10B

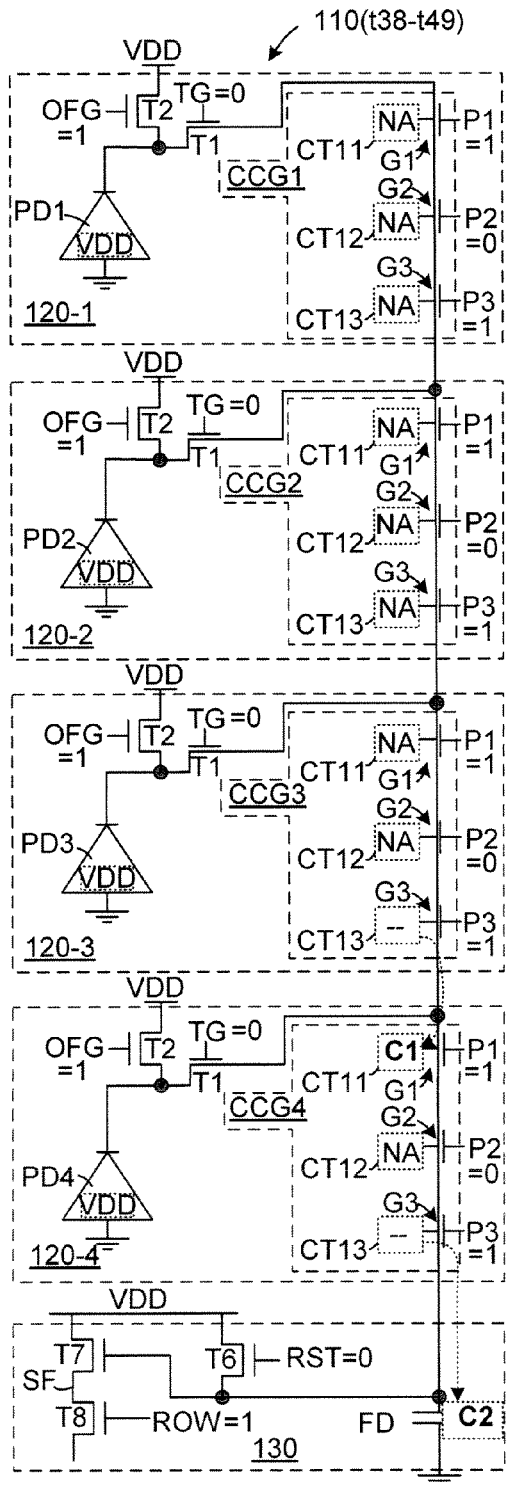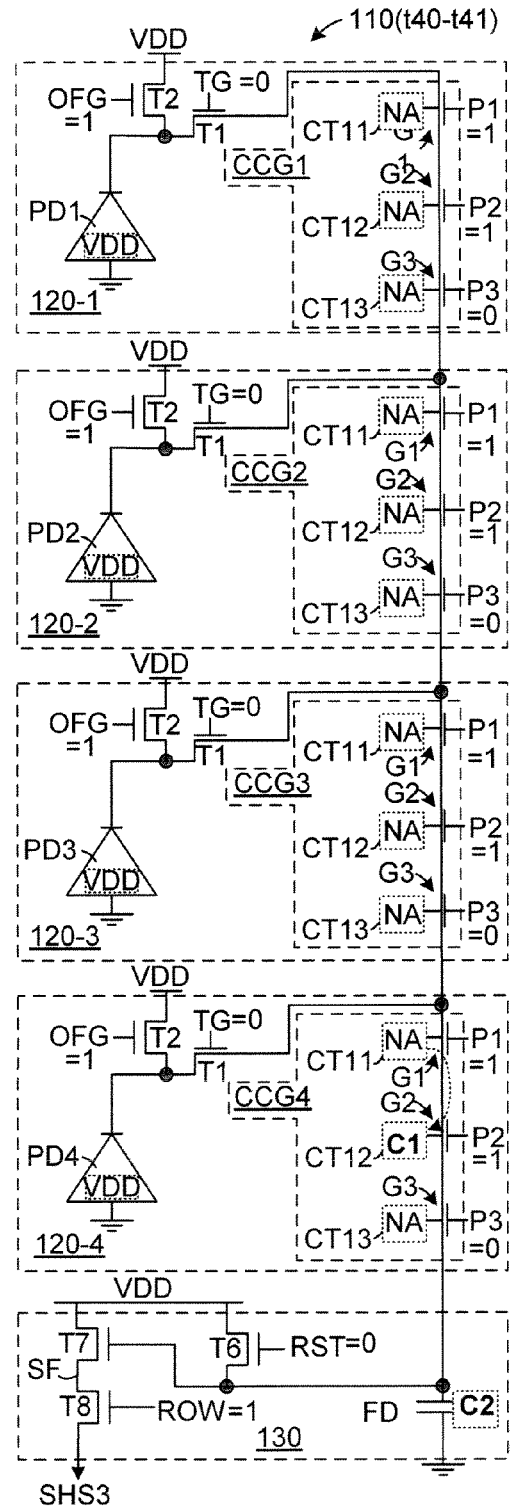
FIG. 10C   FIG. 10D

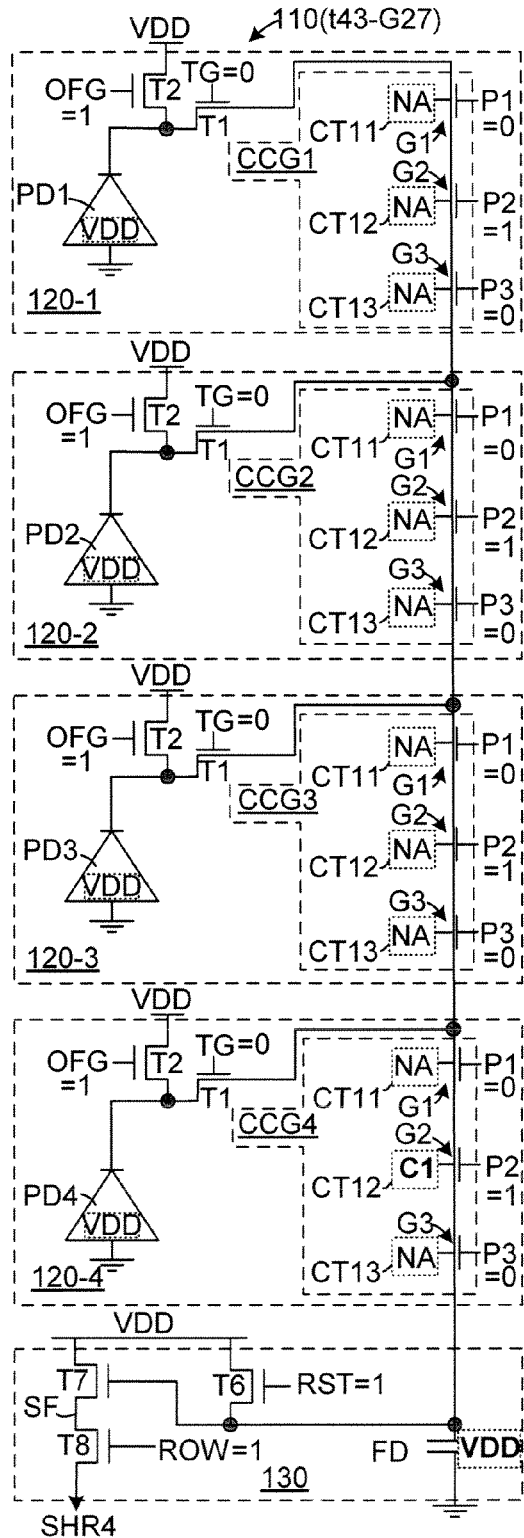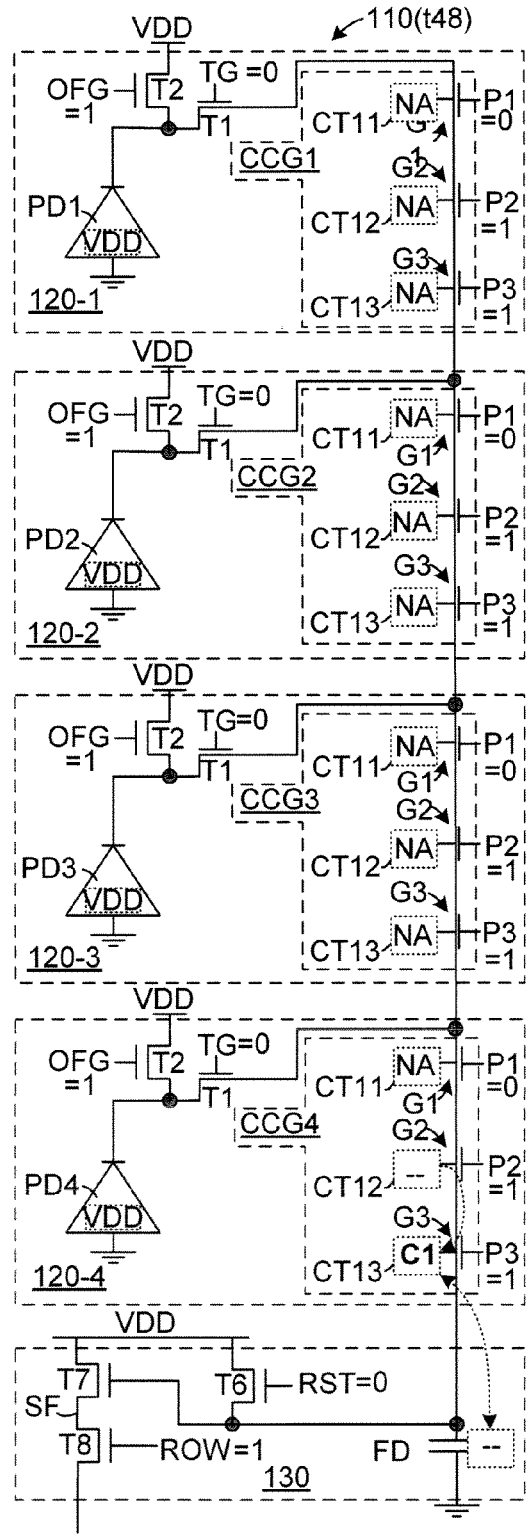
FIG. 11A
FIG. 11B

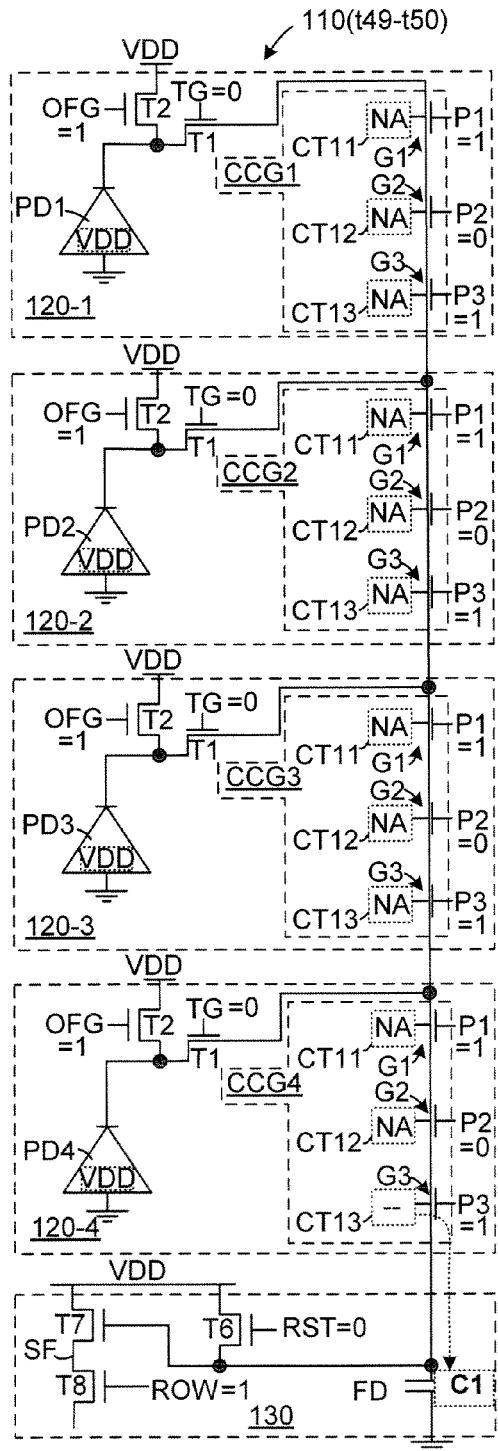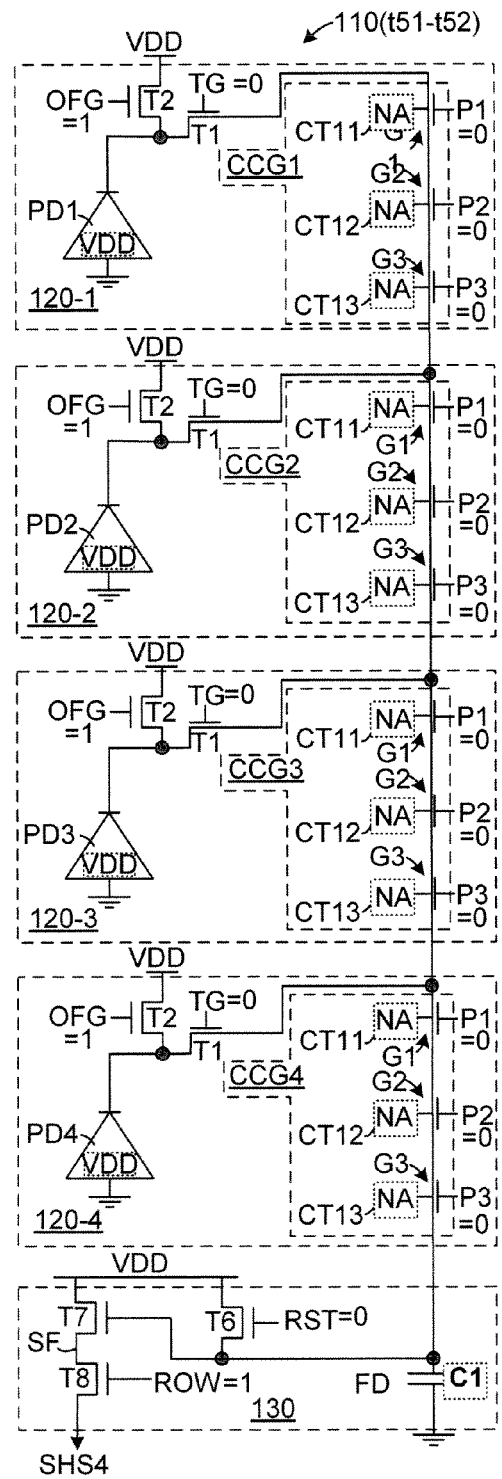
FIG. 11C  FIG. 11D

SHARED READOUT LOW NOISE GLOBAL SHUTTER IMAGE SENSOR

FIELD OF THE INVENTION

This invention relates to solid state image sensors, and more specifically to solid state image sensors having an electronic Global Shutter (GS).

BACKGROUND OF THE INVENTION

Solid-state image sensors are used in, for example, video cameras, and are presently realized in a number of forms including charge coupled devices (CCDs) and CMOS image sensors. These image sensors are based on a two dimensional array of pixels. Each pixel includes a sensing element that is capable of converting a portion of an optical image into an electronic signal. These electronic signals are then used to regenerate the optical image on, for example, a liquid crystal display (LCD).

More recently, however, CMOS image sensors have gained in popularity. Pure CMOS image sensors have benefited from advances in CMOS technology for microprocessors and ASICs and provide several advantages over CCD imagers. Shrinking lithography, coupled with advanced signal-processing algorithms, sets the stage for sensor array, array control, and image processing on one chip produced using these well-established CMOS techniques. Shrinking lithography should also decrease image-array cost due to smaller pixels. However, pixels cannot shrink too much, or they have an insufficient light-sensitive area. Nonetheless, shrinking lithography provides reduced metal-line widths that connect transistors and buses in the array.

Many image sensors utilize an electronic global shutter (GS) in which an image is captured by all of the pixels simultaneously (i.e., the integration of photo-electrons in the photodiode starts and stops at the same time for all pixels), and then the captured image is read out of the pixels, typically using a rolling shutter (RS) operation. Conventional CMOS image sensors that support GS operations include a Memory Node (MN) in each pixel that stores the image information (captured charge) until it is read out. That is, the image information (captured charge) generated in the photodiode of each pixel is transferred to and temporarily stored in the MN of each pixel, and then the captured charges are systematically (e.g., row by row) read out of the MN of each pixel (e.g., one row of pixels at a time) during the RS operation.

One possible way to reduce readout noise in global shutter pixel is to have an additional floating diffusion (FD) for each pixel, and reading out the captured charge using a correlated double sampling (CDS) readout operation. The CDS readout operation is perform by first resetting the FD and reading the reset (typically referred to as a sample-and-hold reset (SHR) signal value), and then transferring the captured charge from the pixel's MN to the pixel's FD and reading the image bit value (typically referred to as a sample-and-hold image (SHS) signal value). The CDS readout approach cancels out the kt/c associated with reset operations, which is otherwise dominant in low light. This noise reduction approach sets more strict design demands on the MN. Since the MN needs to optimized in a way that all the stored charge is transferred to the FD. The result of incomplete charge transfer is low light non-linearity and image lag.

There is an ongoing trend\demand to increase sensor resolution or to decrease pixel size. Decreasing the size of a global shutter pixel capable of CDS is impossible without compromising the active fill factor of the pixel due to the additional floating diffusion in each pixel and the associated control lines (typically four lines per row of pixels) that are required to support both GS image capture and rolling shutter CDS readout operations.

What is needed is an image sensor that supports GS image capture, utilizes low noise CDS readout operations, and facilitates higher resolution than that of conventional approaches by eliminating the need for disposing a floating diffusion in each pixel, and by reducing the number of control signals per pixel to less than four.

SUMMARY OF THE INVENTION

The present invention is directed to a CMOS global shutter (GS) image sensor in which the pixels are arranged in pixel groups that share a readout circuit having single floating diffusion during a rolling shutter (RS) readout operation. Each pixel includes a photodiode, a charge coupled gate (CCG) device (memory node), and a transfer gate connected between the photodiode and the CCG device and controlled during a GS image capture operation such that charge packets (captured charges) generated on the photodiode of each pixel is transferred to and temporarily stored on the CCG device of each pixel. According to an aspect of the present invention, the CCG devices of the pixels in each pixel group are operably coupled to the floating diffusion of that pixel group's shared readout circuit such that the captured charge from each pixel is sequentially transferrable (i.e., controllable such that the captured charges are transferred one at a time) to the floating diffusion during the RS readout operation. By providing a CCG device in each pixel and utilizing shared floating diffusions during the RS readout operation, the present invention facilitates both GS image capture operations and low noise correlated-double-sampling (CDS) readout operations, and also increases the active fill factor of each pixel by eliminating the need for a floating diffusion in each pixel (i.e., by reducing the area taken up by control circuitry in each pixel).

According to an embodiment of the present invention, the CCG devices in each pixel group are controlled by a small number of shared control lines during image capture and readout operations. In a specific embodiment, each CCG device is a three-phase charge transfer shift register circuit (i.e., similar to those used in charge coupled device (CCD) type image sensors) including three charge storage regions respectively controlled by three phase gates such that the storage of a captured charge in the charge storage regions is controlled by an associated phase gate. Corresponding phase gates of the CCG devices in each pixel are controlled by the same shared control line (e.g., the first phase gate of each CCG device, which is connected to the transfer gate in each pixel, is connected to a first shared phase control signal line). By controlling the CCG devices in all pixels of each pixel group using shared control signals, the number of control lines disposed between each row of pixels can be reduced to fewer than the four control lines that are required in conventional devices supporting both GS capture and CDS readout, thereby further enhancing the active fill factor of each pixel in improving the image sensor's efficiency to collect light.

According to a specific embodiment of the present invention, the multi-phase CCG devices of each pixel group are connected in series and controlled by shared phase control signals such that captured charges are shifted along the chain of CCG devices to the floating diffusion during the RS readout operation. That is, the end charge storage regions in each CCG device of a pixel group are connected and electrically coupled either to a first charge storage region in an adjacent CCG device or, in the case of the end (last) CCG device disposed in the last pixel of the chain, to the floating diffusion. This chained CCG device arrangement facilitates both GS capture and RS readout operations that are controlled by minimal number of phase control signal lines (e.g., three phase control signal lines in the case of three-phase CCG devices), thereby further improving the image sensor's efficiency to collect light by minimizing the number of control lines per row of pixel groups.

According to another specific embodiment of the present invention, each pixel in each pixel group includes an overflow gate connected between the photodiode and a voltage source, wherein a gate terminal of each overflow gate connected to a shared signal line. These overflow gates are utilized during pre-integration periods to reset the photodiodes, and are also used to clear charges from the CCG device chains. By controlling the overflow gates of every pixel in the pixel group using a single shared signal line, the image sensor's efficiency to collect light is further improved by minimizing the number of control lines per row of pixels.

According to another specific embodiment of the present invention, the shared readout circuit of each pixel group includes a reset transistor controlled by a reset signal line, a source-follower transistor having a gate terminal connected to the floating diffusion and a row-select transistor connected between the source-follower transistor and a readout signal line, where a gate terminal of the row-select transistor is connected to a row-select signal line. This arrangement both facilitates CDS readout operations, and also reduces the average number of control lines per row of pixels (i.e., because both the reset signal line and the row-select signal line are effectively "shared" by all pixels in the associated pixel group), which further enhances the image sensor's efficiency to collect light.

According to another specific embodiment of the present invention, each pixel group includes four pixels aligned in a column, with the shared readout circuit disposed at end of (e.g., below) the four pixels. By sharing the control signals between the four pixels in the manner mentioned above, this arrangement facilitates the use of eight or fewer control signals per row of pixel groups, which in turn reduces the number of signal lines between each row of pixels to two or less. However, the present invention is not intended to be limited to this specific embodiment unless specified in the appended claims.

According to another specific embodiment of the present invention, the image sensor is formed on a silicon substrate, and the CCG device of each pixel includes an elongated implant region formed near an Si/SiO$_2$ interface formed at the substrate's upper surface, and three polysilicon gate electrodes that form the phase gates of the CCG device, where portions of the elongated implant region form respective charge trapping regions below each of the polysilicon gate electrodes. A first charge trapping region is connected to the transfer transistor by way of an end section of the elongated implant region and an intervening conductor (if used), a third (end) trapping region is connected to either the first charge storage region of an adjacent CCG device or to the floating diffusion, and a second (middle or penultimate) charge trapping region is disposed between the first and third charge trapping regions. In a preferred embodiment the elongated implant region formed using a buried n– channel implant, and a p+ photo-electron barrier implant is disposed below the buried channel implant that serves to prevent electrons from collecting in the buried channel implant, a pixel well/channel stop implant is formed along the sides of the buried channel region, and surface trench isolation (STI) structures are formed along the peripheral edges of the polysilicon gate electrodes to electrically isolate the transistor channels. This arrangement, in conjunction with the floating diffusion provided in the shared readout circuit, facilitates the use of four pixels to form a novel GS image sensor with true correlated double sampling readout operations.

BRIEF DESCRIPTION OF THE DRAWINGS

These and other features, aspects and advantages of the present invention will become better understood with regard to the following description, appended claims, and accompanying drawings, where:

FIGS. 5A, 5B, 5C, 5D, 5E, 5F, 5G, 5H and 5I are timing diagrams showing control signals utilized during integration, transfer and readout operations of the pixel group of FIG. 1;

FIGS. 6A and 6B are simplified circuit diagrams showing signal values and operating states applied to the pixel group of FIG. 1 during an integration phase of a global shutter image capture operation according to an exemplary embodiment of the present invention;

FIGS. 9A, 9B, 9C and 9D are simplified circuit diagrams showing signal values and operating states of the pixel group of FIG. 1 during a second CDS readout phase of a rolling shutter readout operation according to the exemplary embodiment of the present invention;

FIGS. 10A, 10B, 10C and 10D are simplified circuit diagrams showing signal values and operating states of the pixel group of FIG. 1 during a third CDS readout phase of a rolling shutter readout operation according to the exemplary embodiment of the present invention;

FIGS. 11A, 11B, 11C and 11D are simplified circuit diagrams showing signal values and operating states of the pixel group of FIG. 1 during a fourth CDS readout phase of a rolling shutter readout operation according to the exemplary embodiment of the present invention.

DETAILED DESCRIPTION OF THE DRAWINGS

The present invention relates to an improvement in global shutter image sensors. The following description is presented to enable one of ordinary skill in the art to make and use the invention as provided in the context of a particular application and its requirements. As used herein, directional terms such as "above", "below", "vertical", and "horizontal" are intended to provide relative positions for purposes of description, and are not intended to designate an absolute frame of reference. The terms "coupled" and "connected", which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either an electrical (e.g., charge) coupling between two elements or nodes, or a physical direct or indirect connection between two circuit elements. For example, when used to denote physical direct/indirect connection between two elements, the two coupled elements may be directly connected by way of a metal line, or indirectly connected by way of an intervening circuit element (e.g., a capacitor, resistor, inductor, or by way of the source/drain terminals of a transistor). Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
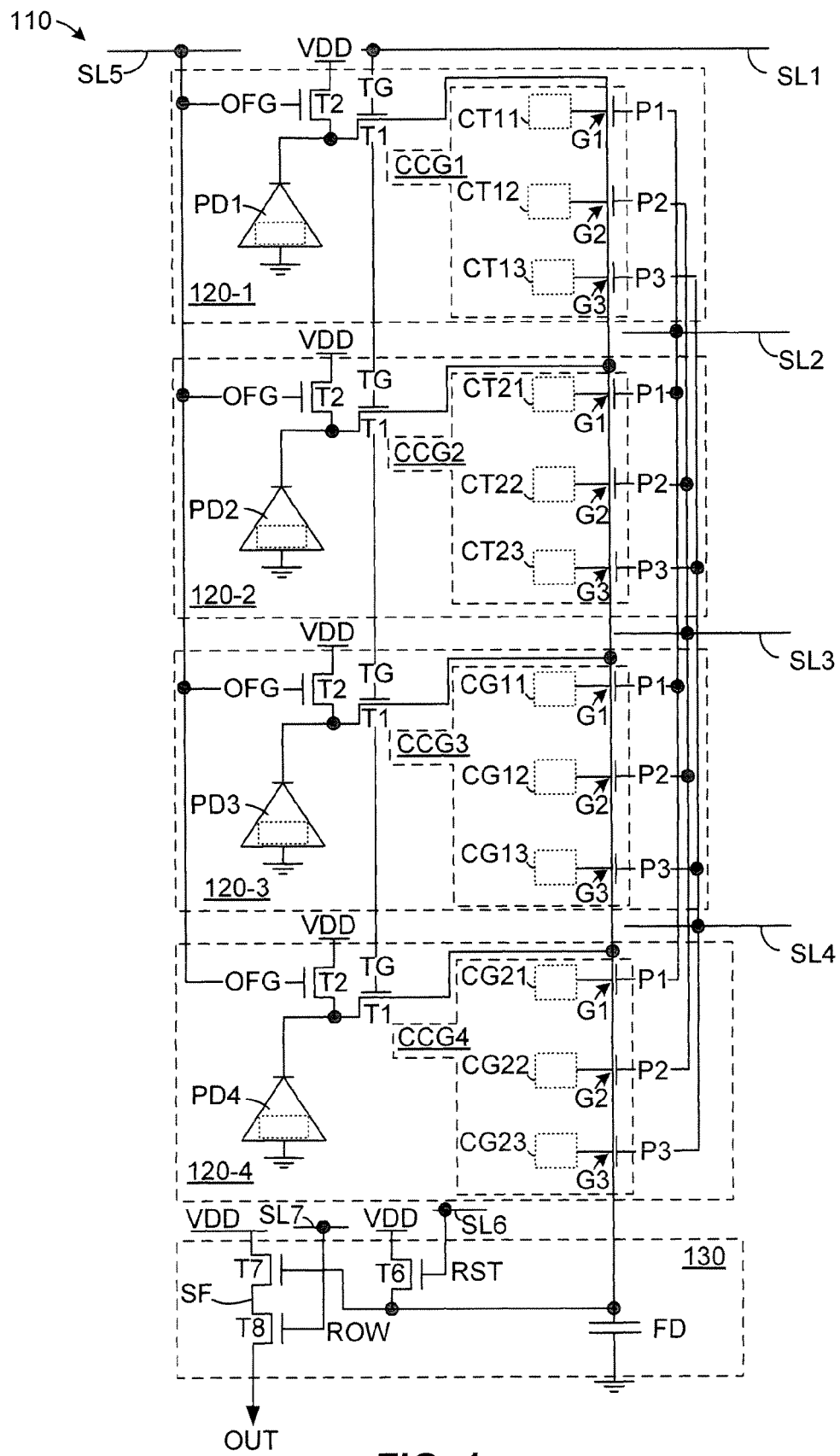
FIG. 1 is a simplified circuit diagram showing a pixel group of an image sensor according to an embodiment of the present invention.
Figure 3:
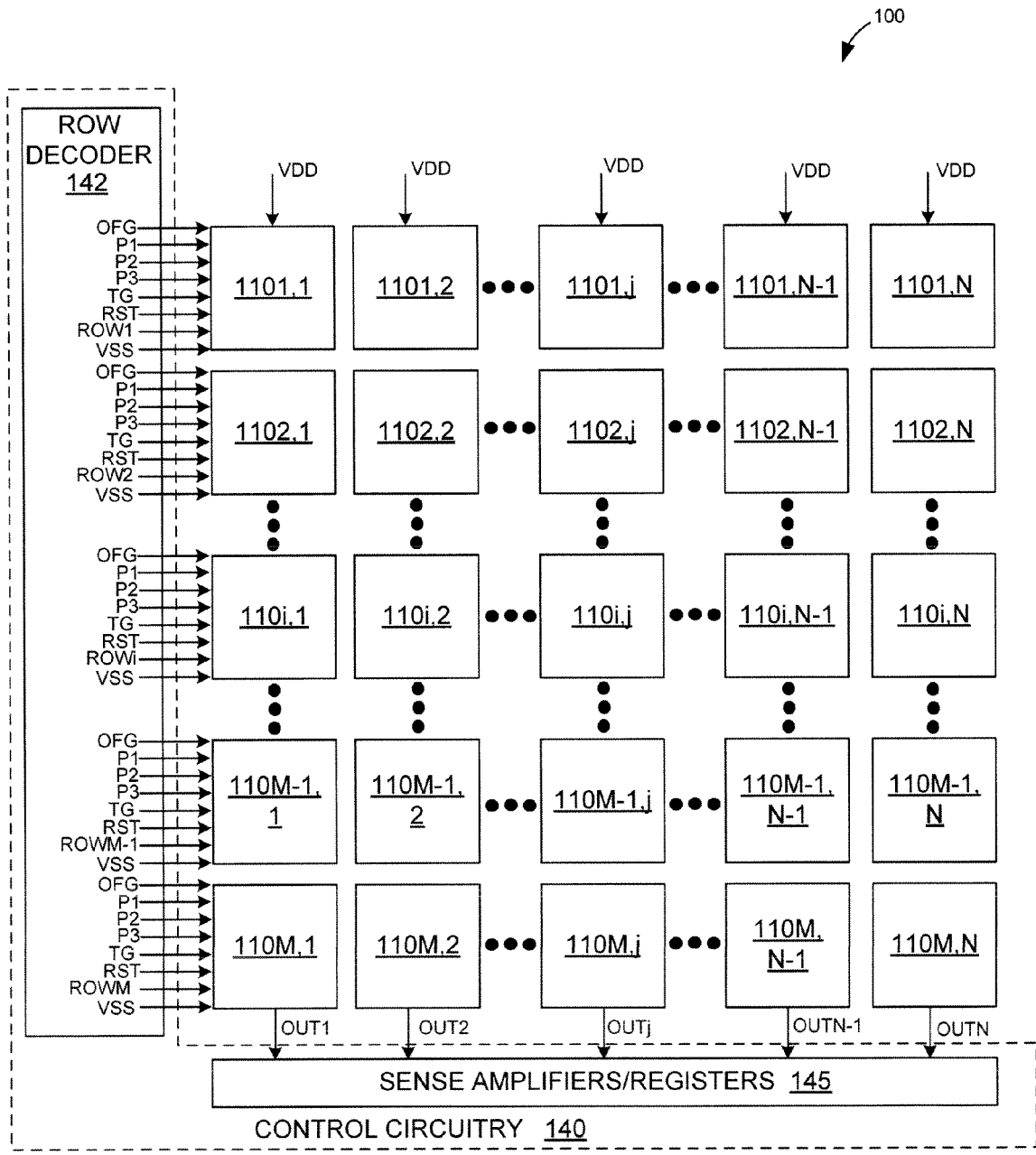
FIG. 3 is a simplified block diagram showing the image sensor of FIG. 1 in additional detail.

FIGS. 1 and 3 show a global shutter (GS) image sensor 100 according to an exemplary embodiment of the present invention, where FIG. 3 shows that image sensor 100 includes multiple pixel groups 1101,1 to 110M,N arranged in rows and columns, and FIG. 1 shows an exemplary pixel group 110 (i.e., each pixel group 1101,1 to 110M,N is formed with the circuit elements shown in FIG. 1).

According to an aspect of the present invention, each pixel group includes multiple pixels that are operably coupled to a shared readout circuit. Referring to FIG. 1, exemplary pixel group 110 includes four pixels 120-1 to 120-4 and a shared readout circuit 130. Any number of pixels may be utilized in each pixel group, but four pixels per pixel group are presently believed to be optimal for balancing the number of horizontal signal lines disposed between each row of pixels and the complexity of the interconnect structures required to implement the rolling shutter readout operation described below. Pixels 120-1 to 120-4 are preferably arranged in a column (i.e., with pixel 120-1 immediately above pixel 120-2 in the column, pixel 120-2 immediately above pixel 120-3, and pixel 120-3 immediately above pixel 120-4), and shared readout circuit 130 is preferably disposed at an end of pixels 120-1 to 120-4 (e.g., positioned immediately below pixel 120-4). This arrangement preference is based on layout considerations to support the rolling shutter readout operation described below. There are other constrains that favor using four (or fewer) pixels in each pixel group, the most important being associated with transfer efficiency. That is, a typical modern CCD achieves a charge transfer efficiency (CTE) of 99.9999%, and the number of lost electrons lost from each charge packet Q transmitted from N CCD pixels in a pixel group is equal to $Q \times (CTE^N)$. This means that if each charge packet includes about 10K electrons (i.e., Q=10K) and each pixel group includes 800 CCD pixels (i.e., N=800), then the number of pixels lost will be only 8 electrons. In contrast to CCDs, with low voltage CMOS image sensors it is difficult to achieve CTE numbers greater than 99.99. %, which significantly increases meaning that a CMOS image sensor having pixel groups including 800 pixels, the loss during transmission of 10K electron packets would be approximately 5K electrons, which of course would be completely impractical. On the other hand, the lower CTE associated with CMOS image sensors becomes insignificant when the number of pixels in each pixel group is reduced to, for example, four (i.e., the transfer of 10K electron packets in a four pixel group yields a loss of about four electrons, which is acceptable). Another problem that can occur in larger pixel groups is vertical blooming.

According to another aspect of the invention, each pixel includes a photodiode, a charge coupled gate (CCG) device, and a transfer gate connected between the CCG device and the photodiode. Referring to the exemplary embodiment shown in FIG. 1, pixels 120-1 to 120-4 respectively include photodiodes PD1 to PD4, CCG devices CCG1 to CCG4, and transfer gates T1 that are respectively connected between each corresponding pair of photodiodes PD1 to PD4 and CCG devices CCG1 to CCG4 in each pixel 120-1 to 120-4. In one embodiment photodiodes PD1 to PD4 are fully-pinned photodiodes formed in accordance with known CMOS (image sensor) fabrication techniques such that they are capable of generating a captured charge (sometimes referred to as a "charge packet") proportional to an amount of light received during an integration (first) phase of a global shutter operation, which is described below. All four transfer gates T1 of pixels 120-1 to 120-4 comprise NMOS transistors that are controlled by a common (single) transfer gate control signal TG that is transmitted on a shared signal line SL to pixel group 110, whereby when control signal TG is asserted, all four transfer gates T1 shown in FIG. 1 turn on simultaneously to pass (all) captured charge from an associated photodiode PD1 to PD4 to an associated CCG device CCG1 to CCG4 (e.g., in pixel 120-1, transfer gate T1 passes a captured charge from photodiode PD1 to CCG device CCG1). Similarly, when control signal TG is de-asserted, all four transfer gates T1 shown in FIG. 1 are turned off to simultaneously isolate photodiodes PD1 to PD4 from CCG device CCG1 to CCG4.

According to another aspect of the present invention, each CCG device CCG1 to CCG4 comprises a multi-phase charge transfer shift register circuit including multiple charge storage regions respectively controlled by associated phase gates such that the storage of the captured charge in the charge storage region is controlled by phase signals supplied to the phase gates. For example, CCG device CCG1 (pixel 120-1) includes charge storage regions CT11, CT12 and CT13 that are respectively controlled by phase gates G1, G2 and G3, whereby a captured charge is stored in one of charge storage regions CT11, CT12 and CT13 in accordance with phase signals P1, P2 and P3 respectively applied to phase gates G1, G2 and G3. As set forth in the examples below, a captured charge is transferred through charge storage region CT11 into charge storage region CT12 during a transfer phase of the global shutter operation, and the transferred from charge storage region CT12 and charge storage region CT13 during the subsequent rolling readout operation. Similarly, CCG device CCG2 includes charge storage regions CT21, CT22 and CT23 that are respectively controlled by associated phase gates G1, G2 and G3 in pixel 120-2, CCG device CCG3 includes charge storage regions CG11, CG12 and CG13 that are respectively controlled by associated phase gates G1, G2 and G3 in pixel 120-3, and CCG device CCG4 includes charge storage regions CG21, CG22 and CG23 that are respectively controlled by associated phase gates G1, G2 and G3 in pixel 120-4. Note that corresponding phase gates in the CCG devices of each pixel group are connected to common control signal lines that carry phase control signals P1, P2 and P3. For example, gate terminals of phase gates G1 of each of CCG devices CCG1 to CCG4 are connected to a shared control signal line SL2 that transmits phase signal P1 to pixel group 110, gate terminals of phase gates G2 of each charge coupled gate device CCG1 to CCG4 are connected to a shared control signal line SL3 carrying phase signal P2, and gate terminals of phase gates G3 of each charge coupled gate device CCG1 to CCG4 are connected to a shared control signal line SL4 carrying phase signal P3. With this arrangement, phase transistors G1 in all four CCG device CCG1 to CCG4 are turned on and off simultaneously by way of control signal P1, phase transistors G2 in all four CCG device CCG1 to CCG4 are turned on and off simultaneously by way of control signal P2, and phase transistors G3 in all four CCG device CCG1 to CCG4 are turned on and off simultaneously by way of control signal P3.

As shown in FIG. 1, CCG devices CCG1 to CCG4 are connected to receive captured charges from photodiodes PD1 to PD4, respectively, and are also connected to form a larger shift register for transferring captured charges to floating diffusion FD of readout circuit 130. That is, the "upper" (first) charge storage regions CT11, CT21, CG11 and CG21 of CCG devices CCG1 to CCG4 are respectively coupled by way of associated transfer gates T1 to receive captured charges from photodiodes PD1 to PD2 during the transfer phase of the global shutter operation (described below), the "middle" (second) charge storage regions CT12, CT22, CG12 and CG22 of CCG devices CCG1 to CCG4 are respectively connected between the upper charge storage regions CT11, CT21, CG11 and CG21 and an associated "lower" charge storage region CT13, CT23, CG13 or CG23. Note that each "lower" (third) charge storage regions CT13, CT23, CG13 and CG23 of each CCG device CCG1 to CCG4 is connected either to the "upper" charge storage region of an adjacent CCG device or to floating diffusion FD. Specifically, charge storage region CT13 of CCG device CCG1 is connected to charge storage region CT21 of CCG device CCG2, charge storage region CT23 of CCG device CCG2 is connected to charge storage region CG11 of CCG device CCG3, charge storage region CG13 of CCG device CCG3 is connected to charge storage region CG21 of CCG device CCG4, and charge storage region CG23 of CCG device CCG4 is connected to floating diffusion FD, whereby CCG devices CCG1 to CCG4 form an elongated charge transfer shift register circuit that facilitates the sequential transfer of four captured charges from pixels 120-1 to 120-4 to floating diffusion FD during the rolling shutter readout operation (discussed below).

Figure 2A:
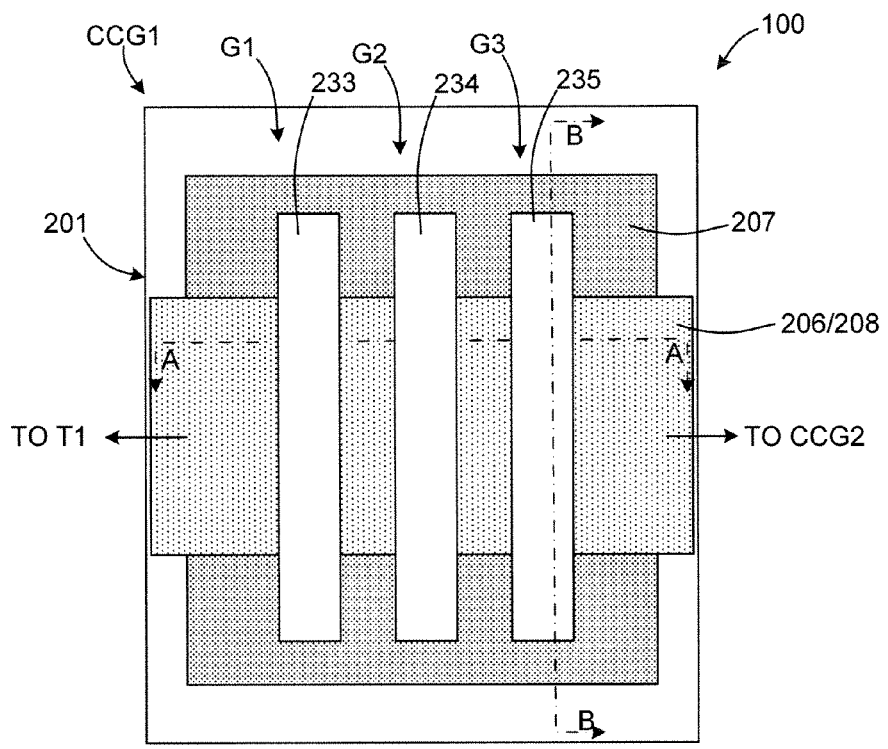
FIGS. 2A, 2B, and 2C are top, cross-sectional front elevation and cross-sectional side elevation views showing an exemplary CCG device utilized in each pixel of the image sensor of FIG. 1.
Figure 2B:
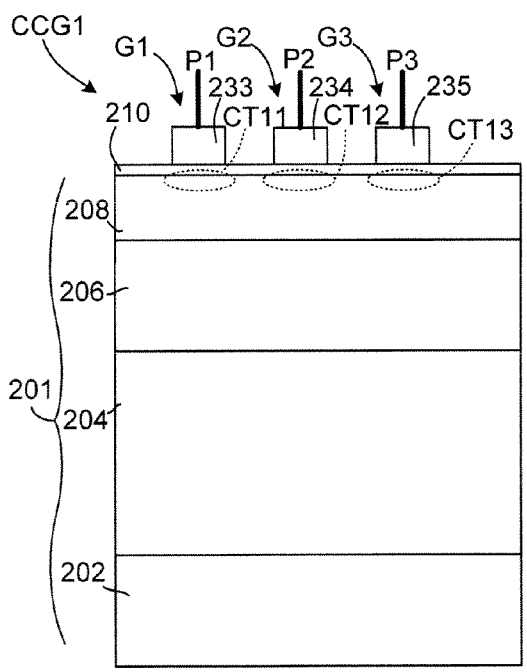
Figure 2C:
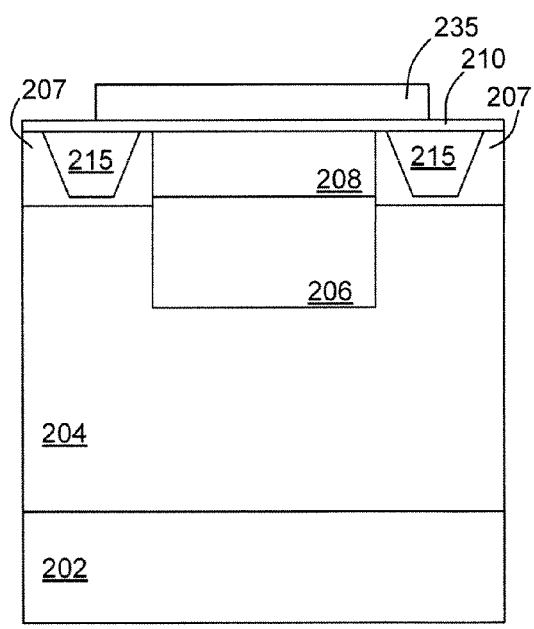

FIGS. 2A to 2C shows CCG device CCG1 in additional detail according to a preferred embodiment of the present invention, where FIG. 2A is a top view and FIGS. 2B and 2C are cross-sectional side and end views taken along section lines B-B and C-C, respectively. Note that CCG device CCG1 is substantially identical to CCG devices CCG2 to CCG4 in each pixel group. Referring to FIG. 2B, CCG device CCG1 is fabricated on a silicon substrate 201 that is processed using known CMOS fabrication techniques to include a p++ diffusion region 202, a p– epi layer region 204 formed over p++ region 202, a p+ photo-electron barrier implant 206 formed over epi layer region 204, and an elongated n-buried channel implant 208 formed over barrier implant 206. Buried channel implant 208 is formed by an n-type implant region located beneath the Si/SiO$_2$ interface between substrate 201 and a silicon dioxide gate oxide layer 210 (i.e., between barrier implant 206 and the substrate surface of substrate 201), and is formed such that a potential minimum is formed a few nanometers below the Si/SiO$_2$ interface. That is, buried channel region 208 is formed such that there is a few kT barrier between the potential minimum and the potential at the Si/SiO$_2$ interface, which prevents electrons from interacting with the traps formed at the Si/SiO$_2$ interface and thus increases charge transfer efficiency (CTE). Photo-electron barrier implant 206 provides a p+ region below buried channel implant 208 that serves to prevent electrons from collecting in buried channel implant 208. Phase gates G1, G2 and G3 are thus formed by spaced-apart polycrystalline silicon (polysilicon) gate electrodes 233, 234 and 235, which are patterned on gate oxide (SiO$_2$) layer 210, and corresponding underlying portions of buried channel region 208 (indicated by dashed-line ovals in FIG. 2B) that form charge trapping regions CT11, CT12 and CT13. Electrodes 233, 234 and 235 are preferably formed using the first poly layer of a compatible CMOS fabrication process, with a minimum spacing (e.g., 0.2 microns when using a 0.18 μm process technology) between adjacent poly gate structures. As indicated in FIG. 2B, electrodes 233, 234 and 235 are connected to shared signal lines carrying control signals P1, P2 and P3, respectively, by way of known metallization techniques. Referring to FIGS. 2A and 2C, a pixel well/channel stop implant 207 is formed along the sides of buried channel region 208, and surface trench isolation (STI) structures 215 are formed along the peripheral edges of polysilicon gate electrodes 233, 234 and 235 to electrically isolate the transistor channels. CCG device CCG1 is thus similar to that used in a conventional three-phase charge coupled device, where phase gate G1 controls the storage of a charge in charge trapping regions CT11 in accordance with phase control signal P1, phase gate G2 controls the storage of a charge in charge trapping regions CT12 in accordance with phase control signal P2, and phase gate G3 controls the storage of a charge in charge trapping regions CT13 in accordance with phase control signal P3. This arrangement, in conjunction with floating diffusion FD of readout circuit 130 (see FIG. 1), facilitates the use of pixels 120-1 to 120-4 to form a novel GS image sensor with true correlated double sampling readout operations (described below). Although the present invention is described with specific reference to pixels utilizing the three-phase CCG device shown in FIGS. 2A-2C, the present invention may be modified to utilize other 3-phase CCG device types as well, and may also be modified to utilize four-phase or virtual-phase CCG devices.

Referring again to FIG. 1, according to the exemplary embodiment each pixel 120-1 to 120-4 also includes an overflow gate transistor T2 connected between the pixel's photodiode and system voltage VDD (e.g., overflow gate transistor T2 pixel 120-1 is connected between photodiode PD1 and voltage supply VDD). Overflow gate transistors T2 serve to reset photodiodes PD1 to PD4 prior to the start of integration, to control charge overflow to VDD during integration and storage, and also to evacuate the CCG devices as set forth below. Similar to transfer gates T1, all four overflow gate transistors T2 of pixels 120-1 to 120-4 are controlled by a common (single) control signal OFG that is transmitted on a single signal line SL5. That is, when control signal OFG is asserted, all four transistors T2 shown in FIG. 1 are turned on to simultaneously couple photodiodes PD1 to PD4 to voltage source VDD, and when control signal OFG is de-asserted, all four transistors T2 shown in FIG. 1 are turned off to simultaneously isolate photodiodes PD1 to PD4 from voltage source VDD.

Referring to the lower portion of FIG. 1, according to another aspect of the present invention, shared readout circuit 130 includes a floating diffusion FD that is coupled to CCG devices CCG1 to CCG4 of pixels 120-1 to 120-4 such that captured charges can be sequentially transferred to floating gate diffusion FD during a rolling shutter readout operation.

In the present embodiment, this charge coupling is achieved by an operable connection between charge trapping region CG23 (i.e., phase transistor G3 of CCG device CCG4) and floating diffusion FD such that a charge can be transferred from charge trapping region CG23 to floating diffusion FD during the charge transfer operations described below.

According to yet another aspect of the disclosed embodiment, CCG devices CCG1 to CCG4 are operably connected in a "4×1" (vertical) sharing scheme that facilitates charge coupling between pixels 120-1 to 120-4 during the charge transfer operations. That is, CCG device CCG1 is disposed adjacent to charge device CCG2 such that charge trapping region CT13/phase transistor G3 of CCG device CCG1 is both physically connected and electrically coupled to charge trapping region CT21/phase transistor G1 of CCG device CCG2, whereby a charge is transferrable from trapping region CT13 to trapping region CT21 in the manner described below. Similarly, CCG device CCG2 is disposed adjacent to charge device CCG3 such that charge trapping region CT23/phase transistor G3 of CCG device CCG2 coupled to charge trapping region CG11/phase transistor G1 of CCG device CCG3, and CCG device CCG3 is disposed adjacent to charge device CCG4 such that charge trapping region CG13/phase transistor G3 of CCG device CCG3 coupled to charge trapping region CG21/phase transistor G1 of CCG device CCG4. As set forth below, this "4×1" sharing scheme arrangement facilitates the sequential transfer of captured charges from CCG devices CCG1 to CCG4 to floating gate diffusion FD using a charge "shift register" operation in which the captured charges are shifted downward along the column to floating diffusion FD. In another possible embodiment, the "4×1" (vertical) sharing scheme of FIG. 1 may be replaced with a "1×4" (horizontal) sharing scheme, or a scheme in which CCG devices CCG1 to CCG4 are coupled in parallel to floating diffusion FD, e.g., by way of associated transfer gates, but this approach would increase the number of control signal lines. Other sharing schemes are also possible, for example by changing the number of pixels in each vertical or horizontal sharing group (e.g., forming N×1 or 1×N sharing schemes), or by forming sharing groups having pixels arranged in a 2×2 pattern (which would be very desirable in terms of charge binning), or an N×N pattern.

In accordance with the exemplary embodiment shown in FIG. 1, shared readout circuit 130 also includes a reset transistor T6, a source-follower transistor T7 and a row select transistor T8. Reset transistor T6 is connected between system voltage VDD and floating diffusion FD, and is controlled by a reset control signal RST transmitted on a sixth horizontal signal line SL6 to reset floating diffusion FD during readout (as described below). In one embodiment reset transistor T6 is also utilized in conjunction with overflow gate transistors T2 in each pixel 120-1 to 120-4 at the beginning of sensor operation to evacuate charge from the CCG chain formed by CCG devices CCG1 to CCG4 (this evacuation is achieved by activating reset transistor T6 and overflow gate transistors T2 and performing a few dummy readout sequences). The voltage stored on floating diffusion FD is applied to a gate terminal of source-follower transistor T7 to generate a source-follower output voltage SF that is supplied to row select transistor T8. Row select transistor T8 is controlled by a row control signal ROW that is transmitted on a seventh horizontal signal line SL7 to transfer source-follower output voltage SF to a vertical signal line, whereby pixel group output signals OUT are transmitted to sense amplifiers located along the edge of the pixel group array (described below with reference to FIG. 3).

FIG. 3 is a block diagram showing image sensor 100 in additional detail, wherein pixel groups 1101,1 to 110M,N are depicted as blocks arranged in an array of horizontal rows and vertical columns, and control circuitry 140 is disposed along a peripheral edge of the array. As set forth above, each pixel group 1101,1 to 110M,N includes circuitry consistent to that of pixel group 100 shown in FIG. 1. In accordance with an aspect of the present invention, each row of pixel groups (e.g. the uppermost row including pixel groups 1101,1 to 1101,N) is controlled by eight or fewer control signals generated by row control circuit 142 (i.e., control signals OFG, P1, P2, P3, TG, RST, ROWx, and an optional second system voltage VSS that is utilized in instances where the ground connection for each pixel is inadequate). Similar to conventional image sensors, output values OUT1 to OUTN are generated by each column during readout. Because these eight control signals are shared by four pixels in each pixel group of each row, only two control lines are disposed between each horizontal row of pixels (in comparison to four control lines required in conventional GS image sensors having CDS capabilities), thereby facilitating a closer spacing between the pixels and, thus, producing a higher resolution image sensor. When arranged correctly (i.e., when the pixels are formed with a minimum of internal routing disposed in the interconnect layer between the silicon surface and the M1 metallization layer), the optical openings above the pixels are not compromised by the inter-pixel signal line routing. Similar to conventional image sensors, pixel group output signals OUT1 to OUTN are transmitted along vertical readout signal lines to sense amplifiers/registers circuit 145 for detection utilizing known techniques.

Figure 4:
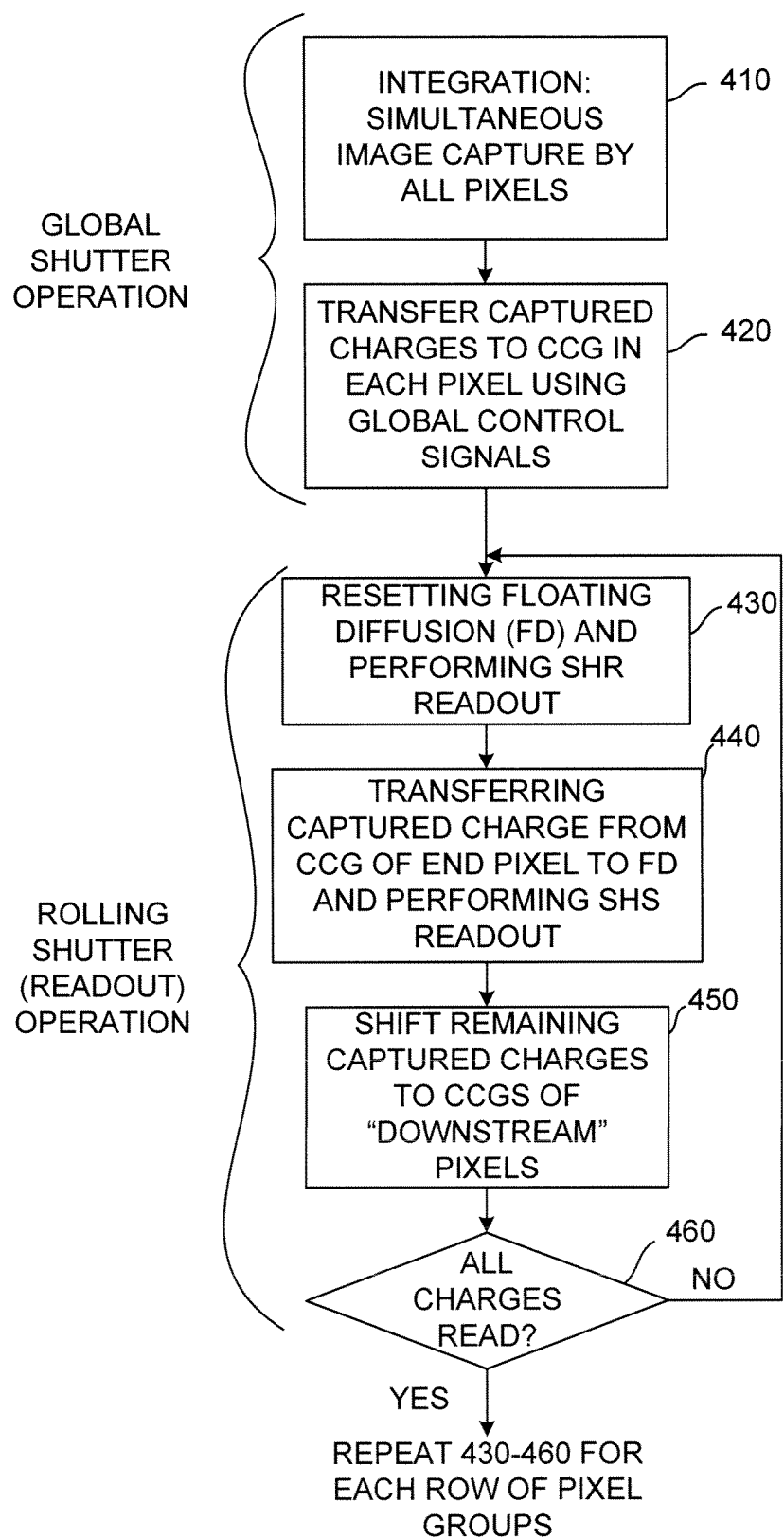
FIG. 4 is a flow diagram showing a generalized method for operating the image sensor of FIG. 1 according to an aspect of the present invention.
Figure 7A:
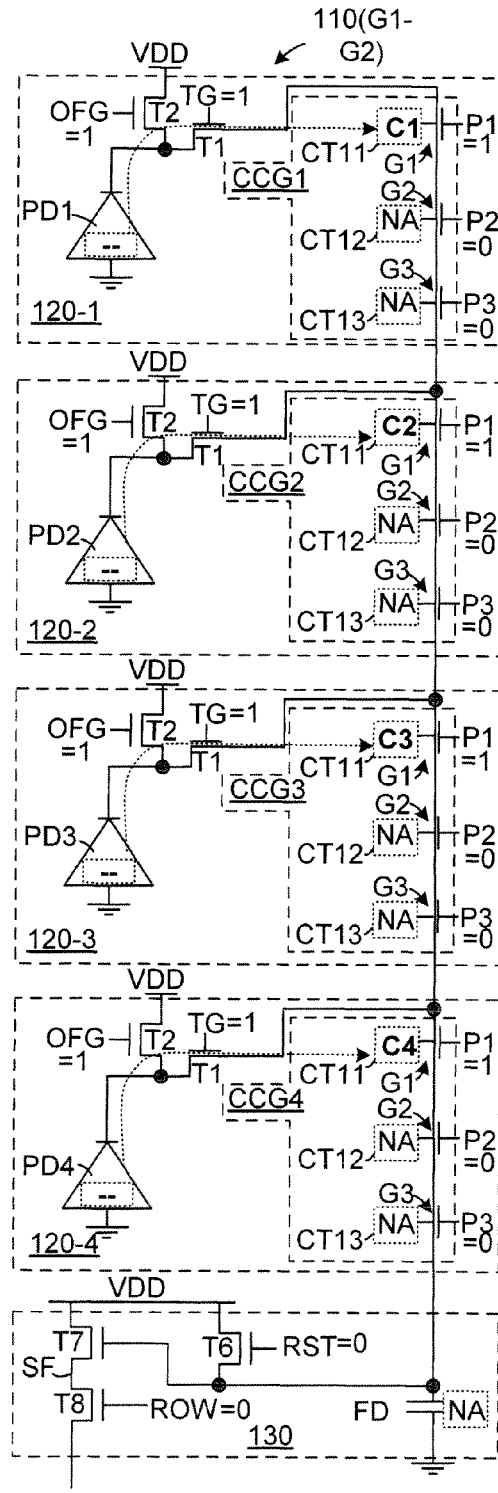
FIGS. 7A and 7B are simplified circuit diagrams showing signal values and operating states applied to the pixel group of FIG. 1 during a charge transfer phase of a global shutter image capture operation according to the exemplary embodiment of the present invention.
Figure 7B:
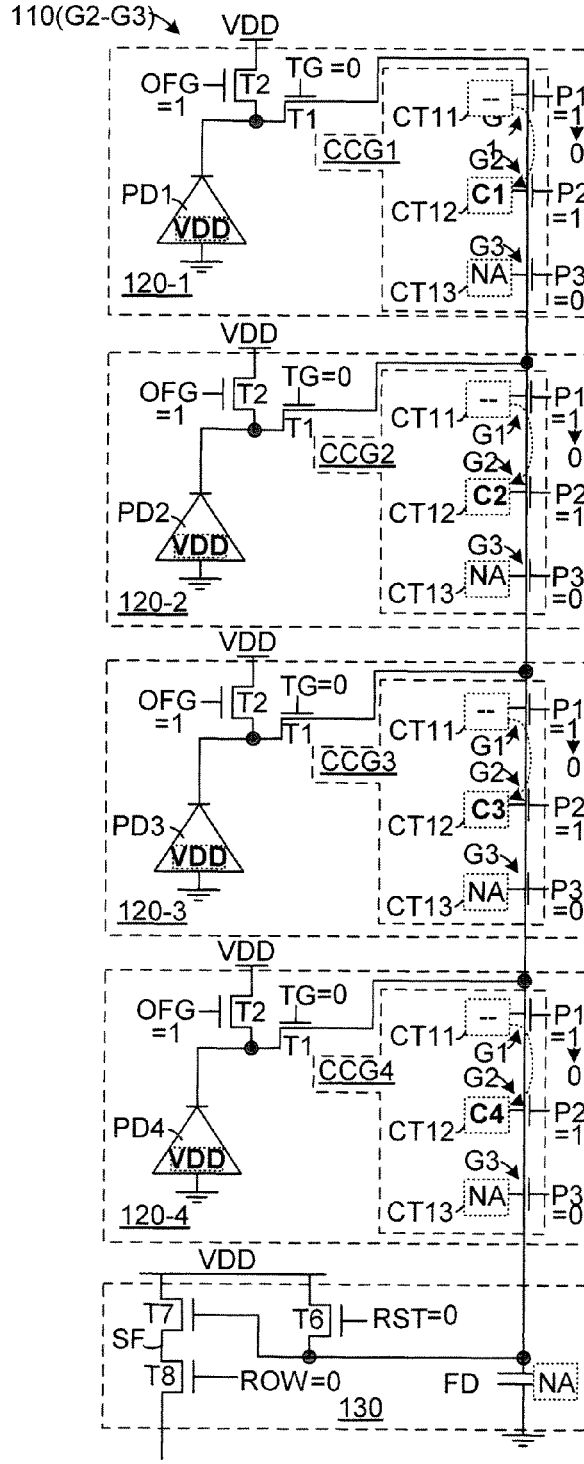

FIG. 4 is a simplified flow diagram depicting a generalized method for operating image sensor 100 as a low noise GS image sensor utilizing control circuit 140 (see FIG. 3) according to another embodiment of the present invention. The method generally includes a global shutter operation (blocks 410 and 420) and a rolling shutter readout operation (blocks 430-460). As set forth below, various combinations of the features associated with the rolling shutter readout operation may be used in combination with the global shutter operation to produce valuable operating methods that are believed fall within the novel characteristics of the present invention. For example, although the generalized method described below describes separate sample-and-hold reset (SHR) and sample-and-hold image (SHS) operations utilized to perform CDS readout operations, the use of a shared readout circuit by several pixels may be utilized without performing the SHR portion of the CDS readout operation. Further, although the generalized method includes shifting captured charges between CCG devices during the readout operation, other approaches may be utilized to transfer the captured charges to the shared readout circuit in each pixel group.

Referring to the upper portion of FIG. 4, the global shutter operation of the method includes an integration phase (block 410) during which all of pixels of the image sensor are controlled using global signals such that the photodiode of each pixel simultaneously captures a corresponding charge, and a subsequent transfer phase (block 420) in which all of the pixels are controlled such that the captured charges are simultaneously transferred from the photodiode to the CCG device in each pixel. Additional detail regarding the specified global shutter operation as performed by pixel group 110 (see FIG. 1) are provided below with reference to FIGS. 5A-5D, 6A-6B and FIGS. 7A-7B.

Referring to the lower portion of FIG. 4, after the global shutter readout operation is completed, the rolling shutter readout operation is performed on one row of pixel groups at a time and is repeated until captured charges are read from every row (e.g., with reference to FIG. 3, the readout operation is performed on the uppermost row including pixel groups 1101,1 to 1101,N first, then the readout operation is performed on the second row including pixel groups 1102,1 to 1102,N, etc., until captured charges are read from every pixel of image sensor 100). During each row readout operation, all pixel groups in each row of the image sensor are controlled using rolling shutter control signals (i.e., these control signals are only sent to the row currently being read), and in the generalized method embodiment includes (block 430) resetting the floating diffusion and transmitting a first SHR value onto a shared output signal line, and then (block 440) transferring a first captured charge to the floating diffusion and transmitting a first SHS value. As indicated by block 460 in FIG. 4, this sequence of reset/SHR read/transfer captured charge/SHS read is repeated for each captured charge stored in pixels of the currently-being-read pixel group (e.g., pixel group 1101,1 in FIG. 3), whereby multiple CDS readout operations are performed during which multiple SHR and multiple SHS values are transmitted from a single shared readout circuit onto an associated output signal line (e.g., output signal line OUT1 in FIG. 3). As indicated below block 460, once the readout process is completed for the "current" row (e.g., the uppermost row in FIG. 3), the reset/SHR read/transfer captured charge/SHS read sequence is repeated by transmitting rolling shutter control signals only to the pixel groups of the next sequential row of pixel groups (e.g., the row including pixel groups 1102,1 to 1102,N in FIG. 3), whereby multiple CDS readout operations are performed during which a second series of SHR and multiple SHS values are transmitted from another shared readout circuit (e.g., that of pixel group 1102,1 in FIG. 3) onto an associated output signal line (e.g., output signal line OUT1 in FIG. 3). This process is then repeated for each row of pixels until all of the captured charges from every pixel of the image sensor have been read out.

Referring to block 450 of FIG. 4, according to a specific embodiment of the present invention, while a first captured charge is being transferred from the CCG device of an "end" pixel (e.g., from CCG device CCG4 of pixel 120-4, see FIG. 1) to the floating diffusion FD of the shared readout circuit, a second captured charge is shifted from the CCG device of a penultimate pixel into the CCG device of the end pixel (e.g., the captured charge generated in pixel 120-3 is transferred from CCG device CCG3 to CCG device CCG4 by way of the connection between phase gate G3 of device CCG3 and phase gate G1 of device CCG4. This shifting operation utilizes the connection between CCG devices CCG1 to CCG4 to facilitate operation of these devices as a shift-register-type device that shifts the four captured charges to the shared readout circuit using a minimum of shared control signals. A more detailed example of this feature and additional details regarding the specified rolling shutter readout operation as performed by pixel group 110 (see FIG. 1) are provided below with reference to FIGS. 5D-5I, 8A-8D, 9A-9D, 10A-10D, and 11A-11D.

FIGS. 5A-5I are timing diagrams showing control signals OFG, TG, P1, P2, P3, RST, ROW, SHR and SHS utilized during an exemplary portion of a global shutter image capture operation performed by image sensor 100 (FIGS. 1 and 3) in accordance with a specific embodiment of the present invention. Specifically, FIGS. 5A-5G respectively show the operating state of control signals OFG, TG, P1, P2, P3, RST and ROW, which are transmitted to a selected row of pixel groups 110 of image sensor 100 (e.g., the uppermost row including pixels 1101,1 to 1101,N in FIG. 3) during the global shutter operation and the beginning the rolling shutter readout operation. Note that global control signals (i.e., control signals simultaneously transmitted to all pixel groups of array 100) are identified in FIGS. 5A-5G with the letter "G", and rolling shutter control signals (i.e., signals transmitted only to a selected pixel group row) are identified in FIGS. 5A-5H with the letter "R". Notice that control signals P1 and P2 have changing modes (i.e., from global to rolling), and that all other signals are either global or rolling. Note also that control signals SHR and SHS (FIGS. 5H and 5I) are generated by control circuitry 140 and applied to sense amplifiers/registers circuit 145 (see FIG. 3). FIGS. 6A-11D are simplified circuit diagrams showing the operating states of the various transistors of exemplary pixel group 110 (described above with reference to FIG. 1) in accordance with the control signals shown in FIGS. 5A-5G. In these figures, a suffix provided after reference numeral "110" indicates the state (i.e., high "1" or low "0") of each control signal TG, OFG, RST and ROW, and each phase signal P1, P2 and P3 (i.e., referring to the top of FIG. 6A, the reference numeral "110(t0-t1)" means that pixel group 110 is shown with the control signal states as generated between time t0 and t1 in the timing diagrams of FIGS. 5A-5I).

Referring to FIG. 5A, the global shutter operation begins with a pre-integration phase during which global control signal OFG is asserted between time t0 and time t1 (all other signals are de-asserted). As indicated by group 110(t0-t1) in FIG. 6A, this control signal combination causes overflow gate transistor T2 of every pixel in image sensor 100 to turn on, thereby coupling every photodiode to system voltage VDD. All other transistors of pixel group 100 remain off during this period.

Referring to FIG. 5B and to group 110(t1-t2), which is shown in FIG. 6B, an integration phase begins at time t1 by de-asserting global control signal OFG, thereby turning off overflow gate transistor T2 to isolate the photodiode in every pixel in image sensor 100. For example, referring to pixel 120-1 at the upper portion of FIG. 6B, because both overflow gate transistor T2 and transfer gate T1 remain turned off, a charge C1 collects on photodiode PD1 in proportion to an amount of light directed onto photodiode PD1. Similarly, charges C2, C3 and C4 respectively collect on photodiodes PD2, PD3 and PD4 in pixels 120-2, 120-3 and 120-4.

The subsequent transfer of captured charges C1-C4 to CCG devices CCG-1 to CCG-4 will now be described with reference to FIGS. 5A to 5D and FIGS. 7A and 7B. The integration in photodiodes PD1 to PD4 (and all remaining photodiodes in the array) ends at time t2 when transfer gate signal TG is activated (see FIG. 5B). To transfer captured charges C1 to C4 into CCG devices CCG1 to CCG4, transfer gate T1 and phase gates G1 and G2 are turned on by asserting phase signal P1 at time t3 (FIG. 5C) and both turning off signal TG transfer gate and asserting of phase signal P2 at time t4 (FIGS. 5B and 5D). As depicted by group 110(t3-t4) in FIG. 7A, this operating state transfers captured charge C1 from photodiode PD1 through transfer gate T1 of pixel 120-1 to charge trapping region CT11 of CCG device CCG1, transfers captured charge C2 from photodiode PD2 to charge trapping region CT21 of CCG device CCG2, transfers captured charge C3 from photodiode PD3 to charge trapping region CG31 of CCG device CCG3, and transfers captured charge C4 from photodiode PD4 to charge trapping region CG21 of CCG device CCG4. As depicted by group 110(t4-t5) in FIG. 7B, when phase signal P2 is fully activated at time t4 and transfer gate signal TG is de-activated (shown in FIG. 5B), captured charge C1 transfers from charge trapping region CT11 to charge trapping region CT12 CCG device CCG1, captured charge C2 transfers from charge trapping region CT21 to charge trapping region CT22 in CCG device CCG2, captured charge C3 transfers from charge trapping region CG31 to charge trapping region CG32 in CCG device CCG3, and captured charge C4 transfers from charge trapping region CG21 to charge trapping region CG22 in CCG device CCG4. Subsequently, global control signal OFG is re-asserted and phase signal P1 is de-activated at time t5 (FIGS. 5A and 5C). Now all captured charges C1 to C4 are located under phase gates G2 in each CCG device CCG1 to CCG4. The transfer of the captured charges is done globally for the entire array. As indicated in FIG. 5D, in accordance with a preferred embodiment, when readout from a particular pixel group is delayed by a few tens of microseconds (e.g., in pixel groups located in the middle to bottom of an image sensor having 200 vertically arranged pixel groups that are read out in a "top-to-bottom pattern), phase signal P2 voltage is reduced at time t6 such that the charges are stored using a lower voltage than the voltage used for transfer. In one practical example using a 3.3V process, the CCG structure is formed with a 70 A gate oxide, the transfer voltage is 3.45V, and the storage voltage is 1V. Alternatively, when a 5V process is used, the CCG structure is formed with a 100 A gate oxide, the transfer voltage is 5.5V, and the storage voltage is 1V. For illustrative purposes, the reduced voltage is indicated in FIGS. 8A-11D as "½". As indicated by the dashed line in FIG. 5D, this voltage reduction may be omitted when the readout delay is on the order of a few microseconds (e.g., in the upper few pixel groups of the 200 group image sensor mentioned above).

Referring to FIG. 5G, row select signal ROW is activated at time t7, which turns on row select transistor T8 (see FIG. 8A) to the associated vertical signal line. Row select signal ROW remains active during all four CDS readout phases described below, where a first CDS readout phase is described with reference to FIGS. 8A-8D, a second CDS readout phase is described with reference to FIGS. 9A-9D, a third CDS readout phase is described with reference to FIGS. 10A-10D, and a fourth CDS readout phase is described with reference to FIGS. 11A-11D.

Figure 8A:
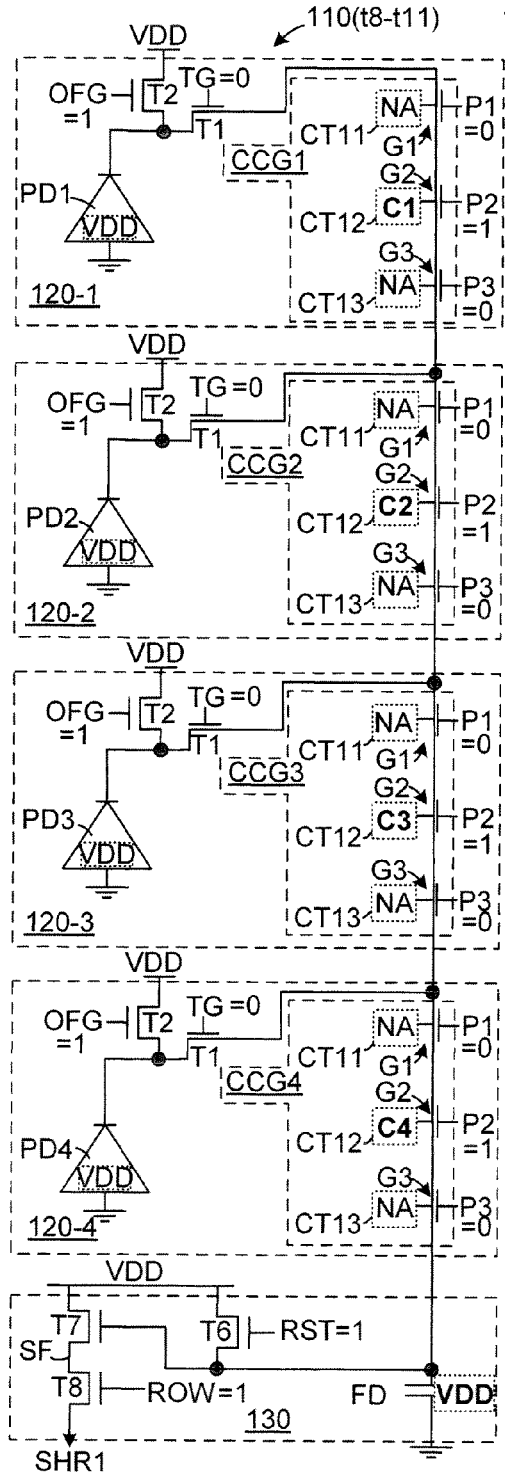
FIGS. 8A, 8B, 8C and 8D are simplified circuit diagrams showing signal values and operating states of the pixel group of FIG. 1 during a first CDS readout phase of a rolling shutter readout operation according to the exemplary embodiment of the present invention.

FIG. 8A shows group 100(t8-t11) including an operating state during the SHR portion of the first CDS readout phase. This readout phase portion begins when control signal SHR is activated at time t8 (FIG. 5H) to prepare the appropriate sense amplifier/registers (not shown) for reading out first SHR values from the readout circuits of all pixel groups in the first row. The reset signal RST is then asserted at time t9 (FIG. 5F), and as indicated in FIG. 8A, the asserted reset signal RST turns on reset transistor T6 to couple floating diffusion FD to system voltage VDD, whereby source follower T7 is fully turned on to generate a first SHR value SHR1 (shown at the bottom of FIG. 8A) that is passed through row select transistor G2 onto the associated output signal line. The first SHR value is sampled between times t9 and t10 after an appropriate settling period. Reset signal RST is subsequently de-asserted at time t10 (FIG. 5F), which turns off reset transistor T6 to again isolate floating diffusion FD from system voltage VDD, and control signal SHR is de-asserted at time t11 (FIG. 5H). Note that charges C1-C4 remain stored in charge trapping regions CT12-CG22, respectively, due to the phase signal P2 applied on all four phase gates G2 of CCG devices CCG1-CCG4.

Figure 8B:
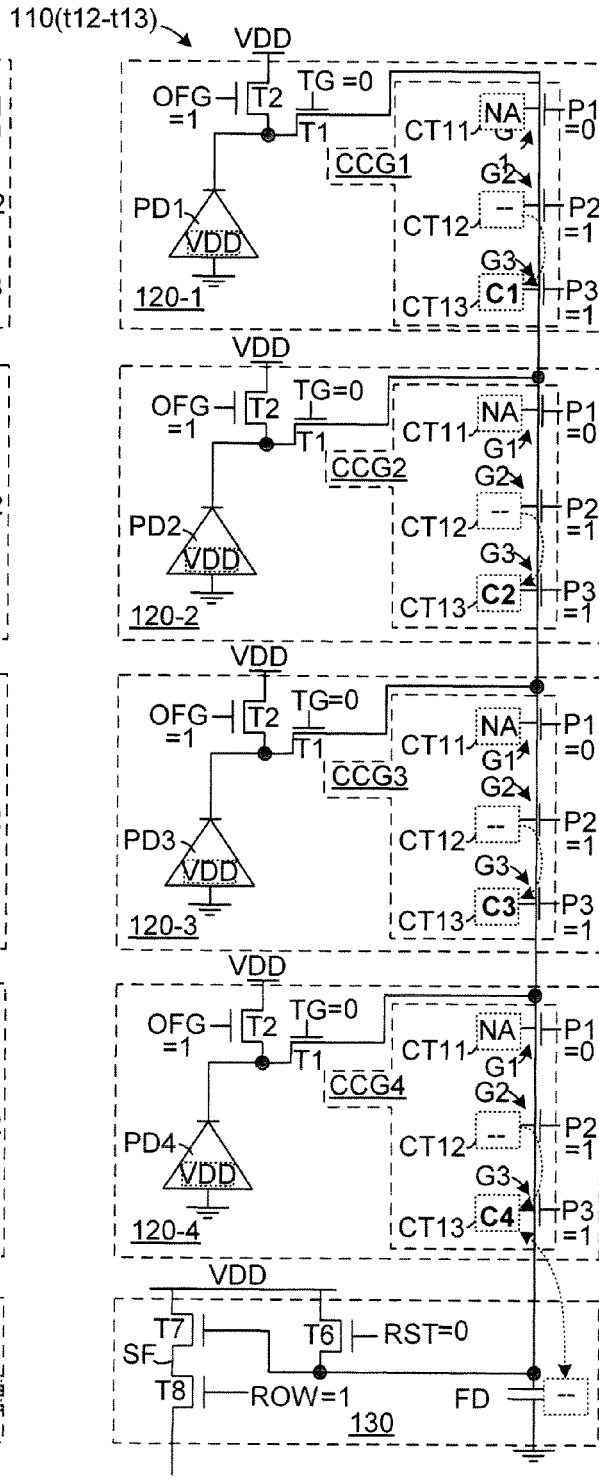

FIG. 8B shows group 100(t12-t13) including an operating state at the beginning of the SHS portion of the first CDS readout phase. This readout phase portion begins when phase signal P3 is asserted at time t12 (FIG. 5E), which activates phase gate G3 such that captured charges C1-C4 shift from "penultimate" charge trapping regions CT12-CG22 of CCG devices CCG1-CCG4, respectively, into "end" charge trapping regions CT13-CG23 of CCG devices CCG1-CCG4, respectively. This charge transfer, which is depicted by the dash-lined arrows in FIG. 8B, is completed when phase signal P2 is de-asserted at time t13 (FIG. 5D). Note that storage of captured charge C4 is now shared by charge trapping region CG23 of CCG device CCG4 and floating diffusion FD, as indicated by the double-arrow dash-line at the bottom of FIG. 8B. That is, because the potential in floating diffusion FD is much lower than the potential in charge trapping region CG23, the charge packet in charge trapping region CG23 flows to floating diffusion FD. In reality, complete transfer of the charge packet will be difficult to achieve, so some of the electrons will flow to floating diffusion FD and some will stay in charge trapping region CG23 until the potential of these two nodes is equal. As described below, when phase gate G3 of pixel 120-4 (i.e., the gate that controls the potential in charge trapping region CG23) is turned off, the potential under charge trapping region CG23 will cause all electrons to transfer into floating diffusion FD.

Figure 8C:
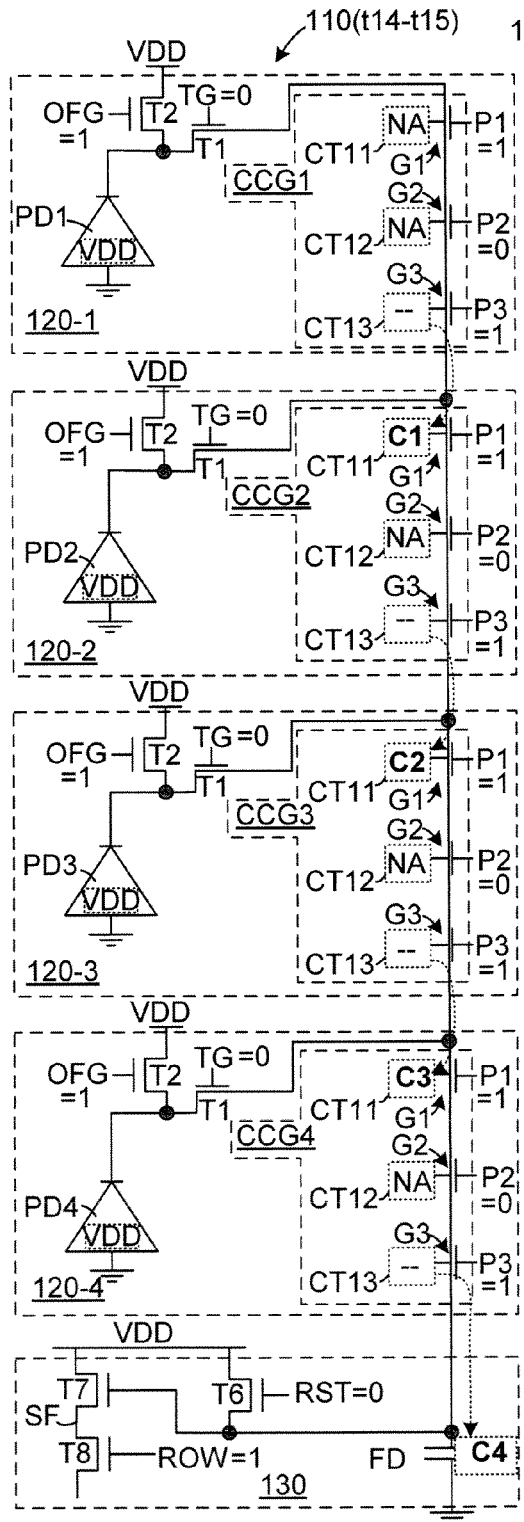

FIG. 8C shows group 100(t14-t15) including an operating state during a charge shifting operation performed during the first CDS readout phase according to the exemplary embodiment. At time t14 control signal SHS (FIG. 5I) is activated to prepare the appropriate sense amplifier/registers (not shown) for reading out first SHS value. At time t15 phase signal P1 is asserted (FIG. 5C), which activates phase gates G1 to prepare CCG devices CCG2-CCG4 for the transfer of captured charges C1-C3 shift from "end" charge trapping regions CT13-CG13 of CCG devices CCG1-CCG3, respectively, into "first" charge trapping regions CT21-CG21 of CCG devices CCG2-CCG4, respectively. This first part of the charge shifting operation is depicted by the dash-lined arrows in FIG. 8C, and couples charges C1 to C3 to charge trapping regions CT21-CG21 of CCG devices CCG2-CCG4, respectively.

Figure 8D:
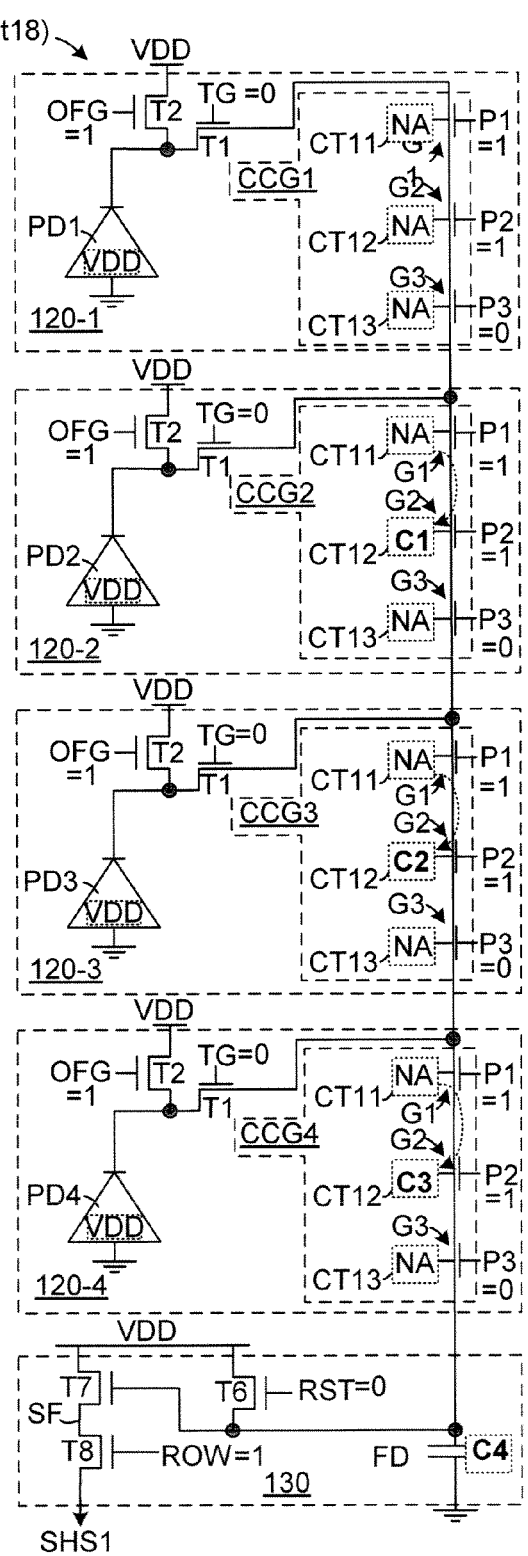

FIG. 8D shows group 100(t16-t18) including an operating state during the final portion of a charge shifting operation and during the SHS readout operation performed during the first CDS readout phase. The charge shifting operation is completed by asserting phase signal P3 at time t16 (FIG. 5E) and asserting phase signal P2 at time t18 (FIG. 5D), which moves captured charges C1-C3 from "first" charge trapping regions CT21-CG21 into middle (or penultimate) charge trapping regions CT22-CG22 of CCG devices CCG2-CCG4, respectively. Note that the de-assertion of phase signal P3 also serves to complete the transfer of captured charge C4 from CCG device CCG4 onto floating diffusion FD, whereby source follower T7 is turned on in proportion to the "value" of captured charge C4 to generate a first SHS value ("SHS1", shown at the bottom of FIG. 8D) that is passed through row select transistor G2 onto the associated output signal line. The first SHS value is sampled between times t14 and t17 after an appropriate settling period, and then control signal SHS is de-asserted at time t17 (FIG. 5I), thus completing the first CDS readout phase.

Figure 9C:
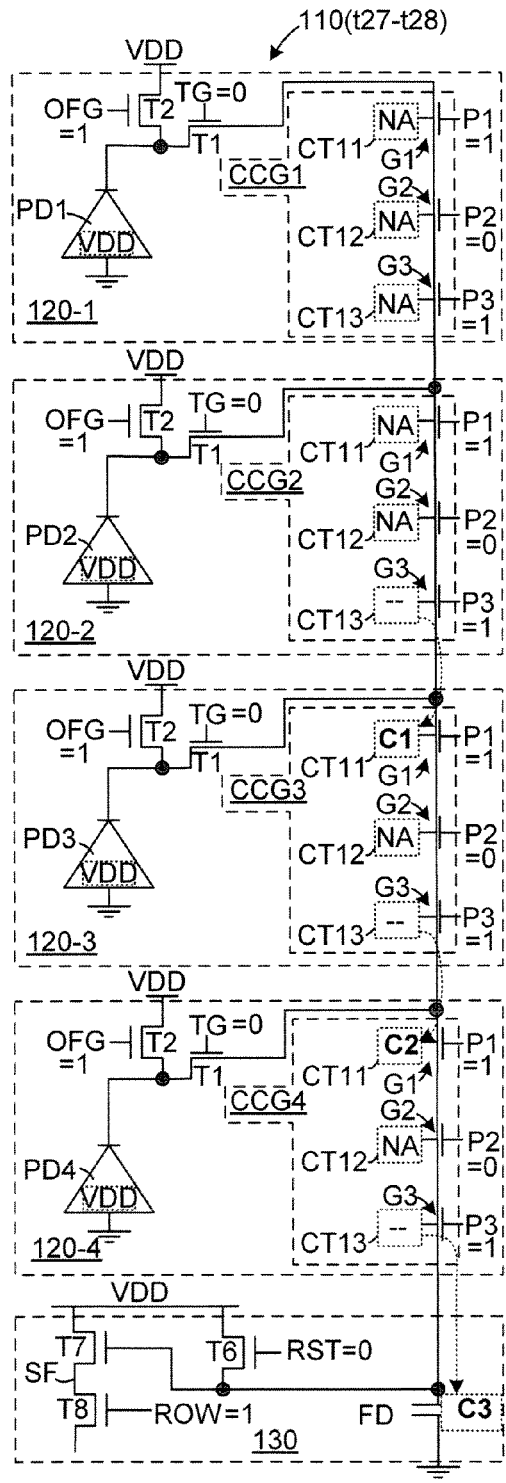
Figure 9D:
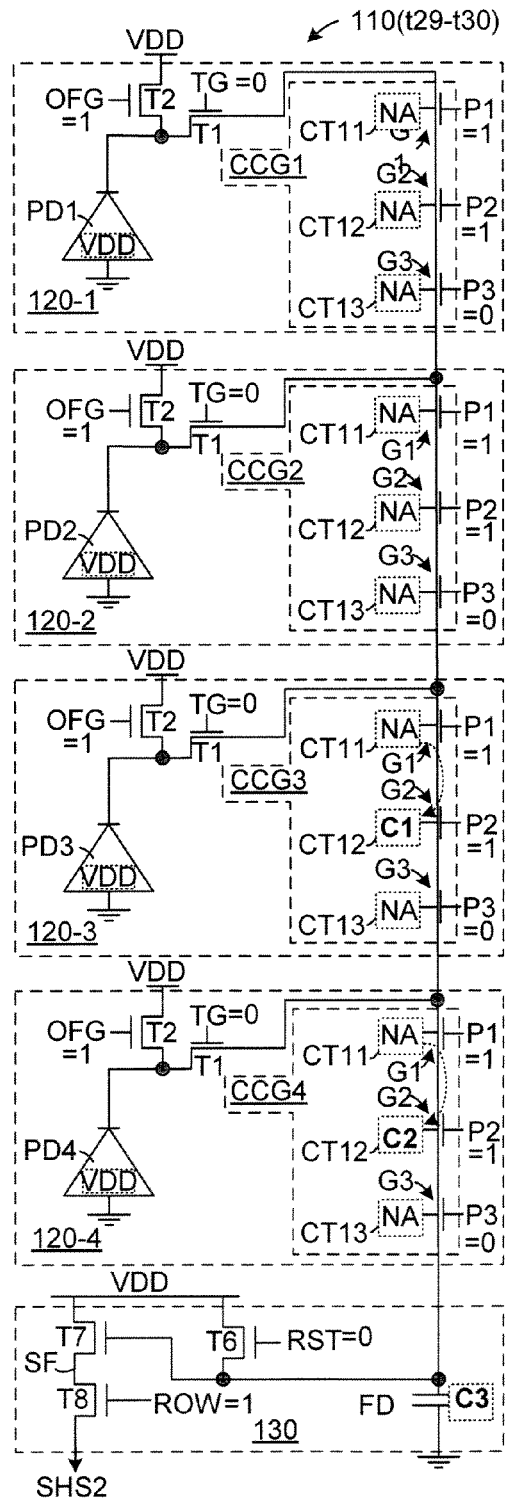

FIGS. 9A-9D depict the second CDS readout phase, which occurs between time t19 and t29 in the timing diagrams of FIGS. 5C-5I, and involves both the CDS readout of "second" captured charge C3 and the "downstream" shift of captured charges C1 and C2 using control signal sequences similar to those described above with reference to the first CDS readout operation. FIG. 9A shows pixel group 110(t19-t20), after control signal SHR is activated at time t19 (FIG. 5H) and reset signal RST is asserted at time t20 (FIG. 5F) to generate a second SHR value SHR2 that is sampled between times t19 and t23. Reset signal RST is subsequently de-asserted at time t22 (FIG. 5F) and control signal SHR is de-asserted at time t20 (FIG. 5H). Note also that phase signal P1 is de-asserted at time t21 (FIG. 5C), thus completing the transfer of charges C1, C2 and C3 into the charge trapping regions CT22, CG12 and CG22, respectively. FIG. 9B shows group 100(t24-t25) when phase signal P3 is asserted (FIG. 5E) and phase gate G3 activated to shift captured charges C1-C3 from charge trapping regions CT22-CG22 into end charge trapping regions CT23-CG23 of CCG devices CCG1-CCG4, respectively. Phase signal P2 is de-asserted at time t25 (FIG. 5D) to complete the transfer. FIG. 9C shows group 100(t27-t28), where phase gates G1 are activated at time t27 by the assertion of phase signal P1 (FIG. 5C), coupling charges C1 and C2 to charge trapping regions CG11 and CG21 of CCG devices CCG3 and CCG4, respectively, and coupling charge C3 to floating diffusion FD. Control signal SHS, which was activated at time t26 (FIG. 5I), now samples coupling charge C3 between times t26 and t29, when it is de-activated, thus completing the second CDS readout phase. As shown by group 110(t29-t30) in FIG. 9D, the second charge shifting operation is completed by de-asserting phase signal P3 at time t28 (FIG. 5E) and asserting phase signal P2 at time t30 (FIG. 5D), which moves captured charges C1 and C2 from charge trapping regions CG11-CG21 into charge trapping regions CG22-CG22 of CCG devices CCG3 and CCG4, respectively.

FIGS. 10A-10D depict the third CDS readout phase involving both the CDS readout of "third" captured charge C2 and the shift of captured charge C1 into CCG device CCG4. FIG. 10A shows pixel group 110(t31-t35), while control signal SHR (FIG. 5H) and reset signal RST (FIG. 5F) are asserted to generate a third SHR value SHR3. FIG. 10B shows group 100(t36-t37) when phase signal P3 is asserted (FIG. 5E) and phase gate G3 is activated to shift captured charges C1 and C2 from charge trapping regions CG12-CG22 into charge trapping regions CG13-CG23 of CCG devices CCG3 and CCG4, respectively. Phase signal P2 is de-asserted at time t37 (FIG. 5D) to complete the transfer. FIG. 100 shows group 100(t38-t39), where phase gates G1 are activated by the assertion of phase signal P1 (FIG. 5C), coupling charge C1 to charge trapping region CG21 of CCG device CCG4, and coupling charge C2 to floating diffusion FD. As shown by group 110 (t40-t41) in FIG. 10D, the third charge shifting operation is completed by asserting phase signal P2 (FIG. 5D) and de-asserting phase signal P3 (FIG. 5E), which moves captured charge C1 into charge trapping region CG22 of CCG device CCG4, and completes the transfer of captured charge C2 from CCG device CCG4 onto floating diffusion FD. Source follower T7 is turned on in proportion to captured charge C2 to generate a third SHS value SHS3 (shown at the bottom of FIG. 10D), which is sampled while control signal SHS is activated during times t38 to t41, and control signal SHS is then de-activated at time t41, thus completing the third CDS readout phase.

FIGS. 11A-11D depict the fourth CDS readout phase involving the CDS readout of "fourth" captured charge C1. FIG. 11A shows pixel group 110(t43-t47), while control signal SHR (FIG. 5H) and reset signal RST (FIG. 5F) are asserted to generate a fourth SHR value SHR4. FIG. 11B shows group 100(t48) when phase signal P3 is asserted (FIG. 5E) and phase gate G3 is activated to shift captured charge C1 from charge trapping regions CG22 into charge trapping region CG23 of CCG device CCG4. FIG. 11C shows group 100(t49-t50), when phase signal P2 is de-asserted (FIG. 5D) to complete this transfer of charge C1 onto charge trapping region CG23 and floating diffusion FD. As shown by group 110(t51-t52) in FIG. 11D, phase signal P3 (FIG. 5E) is de-asserted at time t51 to completely transfer captured charge C1 onto floating diffusion FD, whereby source follower T7 is turned on in proportion to captured charge C1 to generate a fourth SHS value SHS4. Control signal SHS is then de-activated at time t52 (FIG. 5I), thus completing the fourth CDS readout phase.

Referring to FIG. 5G, the first portion of the readout operation ends at time t52 by de-asserting the row select signal transmitted to the first row of pixel groups (e.g., row select signal ROW1 applied to the uppermost row including pixel groups 1101,1 to 1101,N in FIG. 3). The readout operation then proceeds with the assertion of the row select signal transmitted to the second row of pixel groups (e.g., row select signal ROW2 applied to the second row including pixel groups 1102,1 to 1102,N in FIG. 3), and then performing the four CDS readout operations described above with reference to FIGS. 8A-11D. This process is then repeated for each successive row of pixel groups until the last row is accessed (i.e., row select signal ROWM is asserted to access the last row including pixel groups 110M,1 to 110M,N in FIG. 3, and then the four CDS readout operations are performed), thereby completing the capture of image information generated during the integration phase.

As described above, the readout operation is performed in a rolling shutter (line by line) manner similar to substantially all image sensors, but in this case the four captures charges C1 to C4 are read from each pixel group by shifting the captured charges downward from pixels 120-1 to 120-4 to shared readout circuit 130. As a result the charge captured in each pixel spends a different amount of time in each pixel group before being read out (i.e., charge C4 remains in pixel group 110 the least amount of time due to its readout during the first CDS readout phase, and charge C1 remains in pixel group 110 the longest amount of time as it is shifted downward to readout circuit 130).

Figure 12:
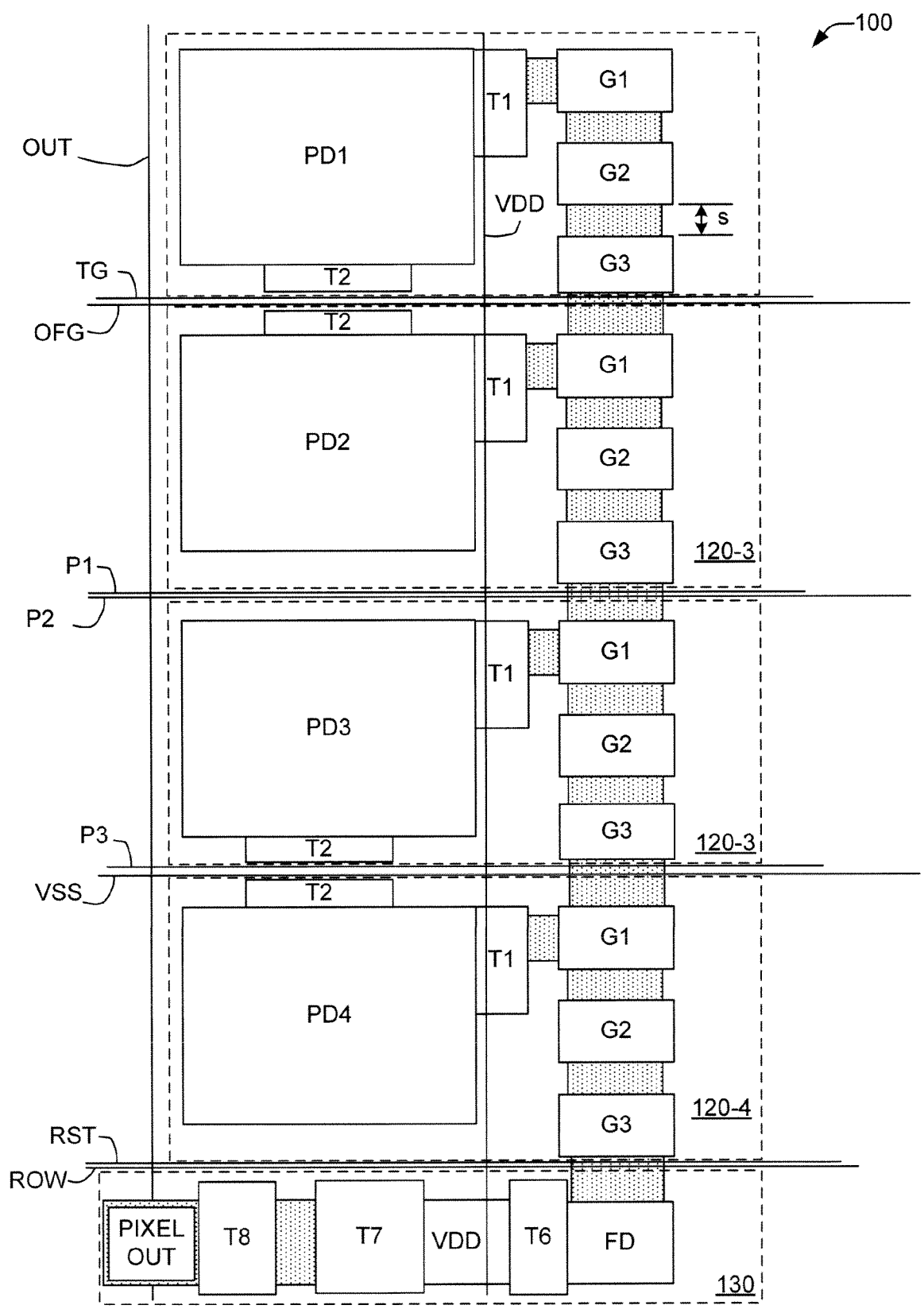
FIG. 12 is a simplified block-level diagram showing an exemplary layout pattern utilized to fabricate the pixel group of FIG. 1 according to a specific embodiment of the present invention.

FIG. 12 is a simplified diagram depicting a preferred layout arrangement utilized to produce pixel group 100 according to another embodiment of the present invention. The depicted layout is optimized for a CMOS process flow, where a first polysilicon (1 POLY) process to form the phase gates P1, P2, P3, OFG transistors, and transfer gates (TGs) of pixels 120-1 to 120-4, and the reset (RST), source-follower (SF) and row select (ROW) transistors of readout circuit 130. A spacing s between the phase gates P1, P2 and P3 is preferably smaller than 0.25 microns to insure large Charge Transfer Efficiency (CTE), and the assignee of this invention achieves a CTE of greater than 0.98 using poly spacing of 0.25 microns or less. In a typical 0.18 μm CMOS process flows, the minimal space between polysilicon structures allowed is typically 0.25 μm, which produces an acceptable device, but in order to realize a better device, the assignee utilizes a proprietary module that achieves a poly-to-poly spacing of 0.2 μm.

A light shield is constructed from the metallization layer that forms global signal lines used to operate the pixel array, and is formed and positioned to block the photons from reaching the ploy gate chain. Internal connections (e.g., for routing the shared control and phase signals to each pixel) are implemented in the interconnect metallization, and are positioned to maximize the optical opening.

Another consideration is whether to use the optional VSS line (mentioned above). The ground connection in a typical image sensor design is supplied through the P+ high conductivity layer, which exists in the substrate. For example, most sensors produced by the assignee of the present application are manufactured on a thin p− epi silicon layer which is grown on a thick p+ wafer. This p+ layer supply the ground from guard rings outside of the array to each of the pixels. A first example of when the VSS external connection for each pixel may be needed is the case of a backside Illumination process, where the back side sensor does not allow for a thick P+ layer, which causes severe degradation of optical performance. In this case the solution is to bring VSS from outside the pixel array using additional line and contact. A first example of when the VSS external connection for each pixel may be needed is when, as in high end sensors, a very deep n implant is formed below the diode array. In this case the substrate is electrically isolated from the pixel P-WELL and again VSS line and contact may be needed.

Although the present invention has been described with respect to certain specific embodiments, it will be clear to those skilled in the art that the inventive features of the present invention are applicable to other embodiments as well, all of which are intended to fall within the scope of the present invention.

The invention claimed is:

1. A global shutter image sensor comprising a plurality of pixel groups arranged in rows and columns, wherein each of the pixel groups includes:
    a plurality of pixels arranged in a associated column of said plurality of columns, each of the pixels including a photodiode, a charge storage device, and a transfer gate connected between the charge storage device and the photodiode, wherein the photodiode of each said pixel includes means for generating a captured charge in accordance with an amount of light received by said each pixel during a first phase of a global shutter operation, and wherein the charge storage device of each said pixel includes means for storing said captured charge when passed from the photodiode to the charge storage device through the transfer gate during a second phase of a global shutter operation, and wherein the charge storage devices of the plurality of pixels are series-connected such that said captured charges are sequentially transferrable from one said charge storage device to an adjacent said charge storage device and toward an end charge storage device during a rolling shutter readout operation; and
    a shared readout circuit disposed in said associated column at an end of said plurality of pixels, said shared readout circuit including a floating diffusion operably coupled only to the end charge storage device of said plurality of pixels in said each pixel group such that said captured charges are sequentially transferrable from the end charge storage device to said floating gate diffusion during said rolling shutter readout operation.

2. The global shutter image sensor according to claim 1, wherein the charge storage device of each said pixel comprises a multi-phase charge transfer shift register circuit including a plurality of charge storage regions respectively controlled by a plurality of phase gates such that the storage of said captured charge in each of the plurality of charge storage regions is controlled by an associated one of said phase gates,
    wherein corresponding phase gates in said charge storage device of said pixels in each said pixel group are connected to common control signal lines such that first gate terminals of first phase gates of each charge storage device are connected to a first shared control signal line, and second gate terminals of second phase gates of each charge storage device are connected to a second shared control signal line, and any additional gate terminals of any additional phase gates of each charge storage device are connected to associated additional shared control signal lines.

3. The global shutter image sensor according to claim 2, wherein the charge storage device of each pixel comprises a three-phase charge transfer shift register circuit including a first charge storage region controlled by said first phase gate, a second charge storage region controlled by said second phase gate, and a third charge storage region controlled by a third phase gate,
    wherein the first charge storage region of each said charge storage device is connected to receive said captured charge passed through the transfer gate of the associated said pixel during said second phase of said global shutter operation,
    wherein the second charge storage region of each said charge storage device is connected between the first charge storage region and the third charge storage region of said each charge storage device, and
    wherein the third charge storage region of at least one of said charge storage devices is connected to the first charge storage region of an adjacent charge storage device, and the third charge storage region of said end charge storage device is connected to the floating diffusion.

4. The global shutter image sensor according to claim 1, wherein the charge storage device of each of the plurality of pixels comprises a three-phase charge transfer shift register circuit comprising:
    an elongated implant region disposed in a semiconductor substrate;
    a gate oxide layer disposed on a surface of the semiconductor substrate;
    a first phase gate comprising a first gate electrode disposed on the gate oxide layer over a first charge trapping region of said elongated implant region;
    a second phase gate comprising a second gate electrode disposed on the gate oxide layer over a second charge trapping region of said elongated implant region; and
    a third phase gate comprising a third gate electrode disposed on the gate oxide layer over a third charge trapping region of said elongated implant region,
    wherein the first charge trapping region is connected to said transfer gate,
    wherein the third charge trapping region of at least one of said charge storage devices is connected to the first charge storage region of an adjacent charge storage device, and the third charge storage region of said end charge storage device is connected to the floating diffusion, and
    wherein the second charge trapping region is disposed between the first and third charge trapping regions.

5. A global shutter image sensor comprising a plurality of pixel groups arranged in rows and columns, wherein each of the pixel groups includes:
    a plurality of pixels, each of the pixels including a photodiode, a charge storage device, and a transfer gate connected between the charge storage device and the photodiode, wherein the photodiode of each said pixel includes means for generating a captured charge in accordance with an amount of light received by said each pixel during a first phase of a global shutter operation, and wherein the charge storage device of each said pixel includes means for storing said captured charge when passed from the photodiode to the charge storage device through the transfer gate during a second phase of a global shutter operation; and
    a shared readout circuit including a floating diffusion operably coupled to the charge storage device of each of said plurality of pixels in said each pixel group such that said captured charges are sequentially transferrable to said floating gate diffusion during a rolling shutter readout operation, wherein the charge storage device of each said pixel comprises a three-phase charge transfer shift register circuit including a first charge storage region controlled by a first phase gate, a second charge storage region controlled by a second phase gate, and a third charge storage region controlled by a third phase gate, whereby the storage of said captured charge in each of the plurality of charge storage regions is controlled by an associated one of said first, second and third phase gates, wherein a gate terminal of said transfer gate of each of the plurality of pixels of said each pixel group is connected to a first shared control signal line;

wherein a gate terminal of said first phase gate of said charge storage device of each of the plurality of pixels of said each pixel group is connected to a second shared signal line;

wherein a gate terminal of said second phase gate of said charge storage device of each of the plurality of pixels of said each pixel group is connected to a third shared signal line; and wherein a gate terminal of said third phase gate of said charge storage device of each of the plurality of pixels of said each pixel group is connected to a fourth shared signal line.

6. The global shutter image sensor according to claim 5, wherein each of the plurality of pixels of said each pixel group further comprises an overflow gate connected between the photodiode and a voltage source, and having a gate terminal connected to a fifth shared signal line.

7. The global shutter image sensor according to claim 5, wherein said readout circuit of each said pixel group further comprises:
a reset transistor connected between a voltage source and said floating diffusion and having a gate terminal connected to a sixth shared signal line;
a source-follower transistor having a gate terminal connected to said floating diffusion; and
a row-select transistor connected between said source-follower transistor and a readout signal line, a gate terminal of said row-select transistor being connected to a seventh shared signal line.

8. The global shutter image sensor according to claim 5, wherein each said pixel group comprises:
a first said pixel having a first said charge storage device;
a second said pixel having a second said charge storage device, wherein the first phase gate of the second said charge storage device is connected the third phase gate of the first said charge storage device;
a third said pixel having a third said charge storage device, wherein the first phase gate of the third said charge storage device is connected the third phase gate of the second said charge storage device; and
a fourth said pixel having a fourth said charge storage device, wherein the first phase gate of the fourth said charge storage device is connected to the third phase gate of the third said charge storage device, and the third phase gate of the fourth said charge storage device is connected to the floating diffusion of said readout circuit,
wherein the first, second third and fourth said pixels are aligned in a column.

9. The global shutter image sensor according to claim 8, wherein each of the first, second, third and fourth pixels of each said pixel group consists of said photodiode, said charge storage device, said transfer gate, and an overflow gate connected between the photodiode and a voltage source.

10. The global shutter image sensor according to claim 8, wherein said readout circuit of each said pixel group consists of said floating diffusion, a reset transistor connected between a voltage source and said floating diffusion, a source-follower transistor connected to said floating diffusion, and a row-select transistor connected to said source-follower transistor.

11. A global shutter image sensor comprising:
a plurality of pixel groups arranged in rows and columns, wherein each of the pixel groups includes:
a plurality of pixels sequentially arranged in one of said plurality of columns, each of the pixels including a photodiode, a multi-phase charge coupled gate (CCG) device, and a transfer gate connected between the photodiode and a first charge storage region of the CCG device; and
a shared readout circuit disposed in the column at an end of said plurality of pixels, said shared readout circuit including a floating diffusion,
wherein said CCG devices of the plurality of pixels in each said pixel group are connected in series such that a last charge storage region of at least one of said CCG devices is connected to the first charge storage region of an adjacent CCG device, and only the last charge storage region of an end said charge storage device disposed at said end of said plurality of pixels is connected to the floating diffusion.

12. The global shutter image sensor according to claim 11, wherein the CCG device of each pixel comprises a three-phase charge transfer shift register circuit including a said first charge storage region controlled by a first phase gate, a second charge storage region controlled by a second phase gate, and said last charge storage region controlled by a third phase gate,
wherein the first charge storage region of each said CCG device is connected to receive said captured charge passed through the transfer gate of the associated said pixel during said second phase of said global shutter operation, and
wherein the second charge storage region of each said CCG device is connected between the first charge storage region and the third charge storage region of said each CCG device.

13. A global shutter image sensor comprising:
a plurality of pixel groups arranged in rows and columns, wherein each of the pixel groups includes:
a plurality of pixels sequentially arranged in one of said plurality of columns, each of the pixels including a photodiode, a multi-phase charge coupled gate (CCG) device, and a transfer gate connected between the photodiode and a first charge storage region of the CCG device; and
a shared readout circuit disposed in the column at an end of said plurality of pixels, said shared readout circuit including a floating diffusion,
wherein said CCG devices of the plurality of pixels in each said pixel group are connected in series such that a last charge storage region of each said CCG device is connected to one of the first charge storage region of an adjacent CCG device and the floating diffusion,
wherein the CCG device of each pixel comprises a three-phase charge transfer shift register circuit including said first charge storage region controlled by a first phase gate, a second charge storage region controlled by a second phase gate, and said last charge storage region controlled by a third phase gate,
wherein the first charge storage region of each said CCG device is connected to receive said captured charge passed through the transfer gate of the associated said pixel during said second phase of said global shutter operation, wherein the second charge storage region of each said CCG device is connected between the first charge storage region and the third charge storage region of said each CCG device, wherein a gate terminal of said transfer gate of each of the plurality of pixels of said each pixel group is connected to a first shared control signal line;

wherein a gate terminal of said first phase gate of said CCG device of each of the plurality of pixels of said each pixel group is connected to a second shared signal line;

wherein a gate terminal of said second phase gate of said CCG device of each of the plurality of pixels of said each pixel group is connected to a third shared signal line; and wherein a gate terminal of said third phase gate of said CCG device of each of the plurality of pixels of said each pixel group is connected to a fourth shared signal line.

14. The global shutter image sensor according to claim 13, wherein each of the plurality of pixels of said each pixel group further comprises an overflow gate connected between the photodiode and a voltage source, and having a gate terminal connected to a fifth shared signal line.

15. The global shutter image sensor according to claim 14, wherein said readout circuit of each said pixel group further comprises:
a reset transistor connected between a voltage source and said floating diffusion and having a gate terminal connected to a sixth shared signal line;
a source-follower transistor having a gate terminal connected to said floating diffusion; and
a row-select transistor connected between said source-follower transistor and a readout signal line, a gate terminal of said row-select transistor being connected to a seventh shared signal line.

16. The global shutter image sensor according to claim 13, wherein each said pixel group comprises:
a first said pixel having a first said CCG device;
a second said pixel having a second said CCG device, wherein the first charge storage region of the second said CCG device is connected the last charge storage region of the first said CCG device;
a third said pixel having a third said CCG device, wherein the first charge storage region of the third said CCG device is connected the last charge storage region of the second said CCG device; and
a fourth said pixel having a fourth said CCG device, wherein the first charge storage region of the fourth said CCG device is connected to the last charge storage region of the third said CCG device, and the last charge storage region of the fourth said CCG device is connected to the floating diffusion of said readout circuit.

17. The global shutter image sensor according to claim 16, wherein each of the first, second, third and fourth pixels of each said pixel group consists of said photodiode, said CCG device, said transfer gate, and an overflow gate connected between the photodiode and a voltage source.

18. The global shutter image sensor according to claim 16, wherein said readout circuit of each said pixel group consists of said floating diffusion, a reset transistor connected between a voltage source and said floating diffusion, a source-follower transistor connected to said floating diffusion, and a row-select transistor connected to said source-follower transistor.

19. A global shutter image sensor comprising:
a plurality of pixel groups arranged in rows and columns, wherein each of the pixel groups includes:
a plurality of pixels sequentially arranged in one of said plurality of columns, each of the pixels including a photodiode, a multi-phase charge coupled gate (CCG) device, and a transfer gate connected between the photodiode and a first phase gate of the CCG device; and
a shared readout circuit including a floating diffusion operably coupled to the CCG device of each of said plurality of pixels in said each pixel group and a reset transistor connected between the floating diffusion and a voltage source, wherein a gate terminal of said transfer transistor gate of each of the plurality of pixels of said each pixel group is connected to a first shared control signal line, wherein a gate terminal of said first phase gate of said CCG device of each of the plurality of pixels of said each pixel group is connected to a second shared signal line, wherein a gate terminal of a second phase gate of said CCG device of each of the plurality of pixels of said each pixel group is connected to a third shared signal line, and wherein a gate terminal of a third phase gate of said CCG device of each of the plurality of pixels of said each pixel group is connected to a fourth shared signal line.

20. The global shutter image sensor according to claim 19, wherein each of the plurality of pixels of said each pixel group further comprises an overflow gate connected between the photodiode and a voltage source, and having a gate terminal connected to a fifth shared signal line, and wherein said readout circuit of each said pixel group further comprises:
a reset transistor connected between a voltage source and said floating diffusion and having a gate terminal connected to a sixth shared signal line;
a source-follower transistor having a gate terminal connected to said floating diffusion; and
a row-select transistor connected between said source-follower transistor and a readout signal line, a gate terminal of said row-select transistor being connected to a seventh shared signal line.

* * * * *